(12) United States Patent
Heisey et al.

(10) Patent No.: US 9,440,562 B2
(45) Date of Patent: Sep. 13, 2016

(54) JUVENILE VEHICLE SEAT WITH ADJUSTABLE BASE

(71) Applicant: Cosco Management, Inc., Wilmington, DE (US)

(72) Inventors: Nathan W. Heisey, Seymour, IN (US); Carl P. Gasner, Columbus, IN (US); Troy D. Mason, Brownsburg, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 0 days.

(21) Appl. No.: 14/212,392

(22) Filed: Mar. 14, 2014

(65) Prior Publication Data

US 2014/0265488 A1 Sep. 18, 2014

Related U.S. Application Data

(60) Provisional application No. 61/801,192, filed on Mar. 15, 2013, provisional application No. 61/907,850, filed on Nov. 22, 2013.

(51) Int. Cl.
*B60N 2/28* (2006.01)
*A47D 13/02* (2006.01)

(52) U.S. Cl.
CPC .......... *B60N 2/2821* (2013.01); *A47D 13/025* (2013.01); *B60N 2/2845* (2013.01); *B60N 2/2875* (2013.01)

(58) Field of Classification Search
CPC  B60N 2/2875; B60N 2/2821; B60N 2/2825; B60N 2/2845; A47D 13/025; A47D 13/02
USPC ....................... 297/256.13, 256.16
See application file for complete search history.

(56) References Cited

U.S. PATENT DOCUMENTS

| | | | |
|---|---|---|---|
| 4,733,909 A | 3/1988 | Single | |
| 4,750,783 A | 6/1988 | Irby | |
| 5,810,436 A | 9/1998 | Surot | |
| 5,836,650 A | 11/1998 | Warner | |
| 5,997,086 A | 12/1999 | Gibson | |
| 6,017,088 A | 1/2000 | Stephens | |
| 6,042,182 A | 3/2000 | Geis | |
| 6,139,101 A | 10/2000 | Berringer et al. | |
| 6,299,249 B1 | 10/2001 | Mori | |
| 6,318,799 B1 | 11/2001 | Greger | |
| 6,347,832 B2 | 2/2002 | Mori | |
| 6,454,350 B1 | 9/2002 | Celestina-Krevh et al. | |
| 6,554,358 B2 | 4/2003 | Kain (Dorel) | |
| 6,705,676 B1 | 3/2004 | Berringer et al. | |
| 6,817,665 B2 * | 11/2004 | Pacella ................ | B60N 2/2806 297/216.11 |
| 6,834,915 B2 | 12/2004 | Sedlack | |
| 6,863,345 B2 | 3/2005 | Kain (Dorel) | |
| 6,979,057 B2 | 12/2005 | Sedlack | |
| 7,097,245 B2 * | 8/2006 | Barker ................. | B60N 2/2803 297/256.14 |
| 7,207,628 B2 | 4/2007 | Eros | |
| 7,597,396 B2 | 10/2009 | Longenecker et al. | |
| 7,658,446 B2 | 2/2010 | Meeker et al. | |
| 7,798,571 B2 | 9/2010 | Billman et al. | |
| 2009/0322132 A1* | 12/2009 | Gillett ...................... | 297/256.13 |
| 2010/0244519 A1* | 9/2010 | Dingler et al. .......... | 297/256.16 |
| 2011/0169309 A1* | 7/2011 | Williams et al. ........ | 297/256.13 |
| 2011/0169310 A1* | 7/2011 | Keegan et al. ......... | 297/256.16 |
| 2011/0193382 A1* | 8/2011 | Gaudreau et al. ....... | 297/256.13 |
| 2011/0298259 A1* | 12/2011 | Heisey ................... | 297/256.16 |

* cited by examiner

*Primary Examiner* — Milton Nelson, Jr.
(74) *Attorney, Agent, or Firm* — Barnes & Thornburg LLP

(57) ABSTRACT

A child restraint includes an adjustable base for installation on a passenger seat of a vehicle. The child restraint also includes an infant carrier associated with the adjustable base. The adjustable base is configured to be adjusted to tilt the infant carrier relative to the passenger seat.

19 Claims, 15 Drawing Sheets

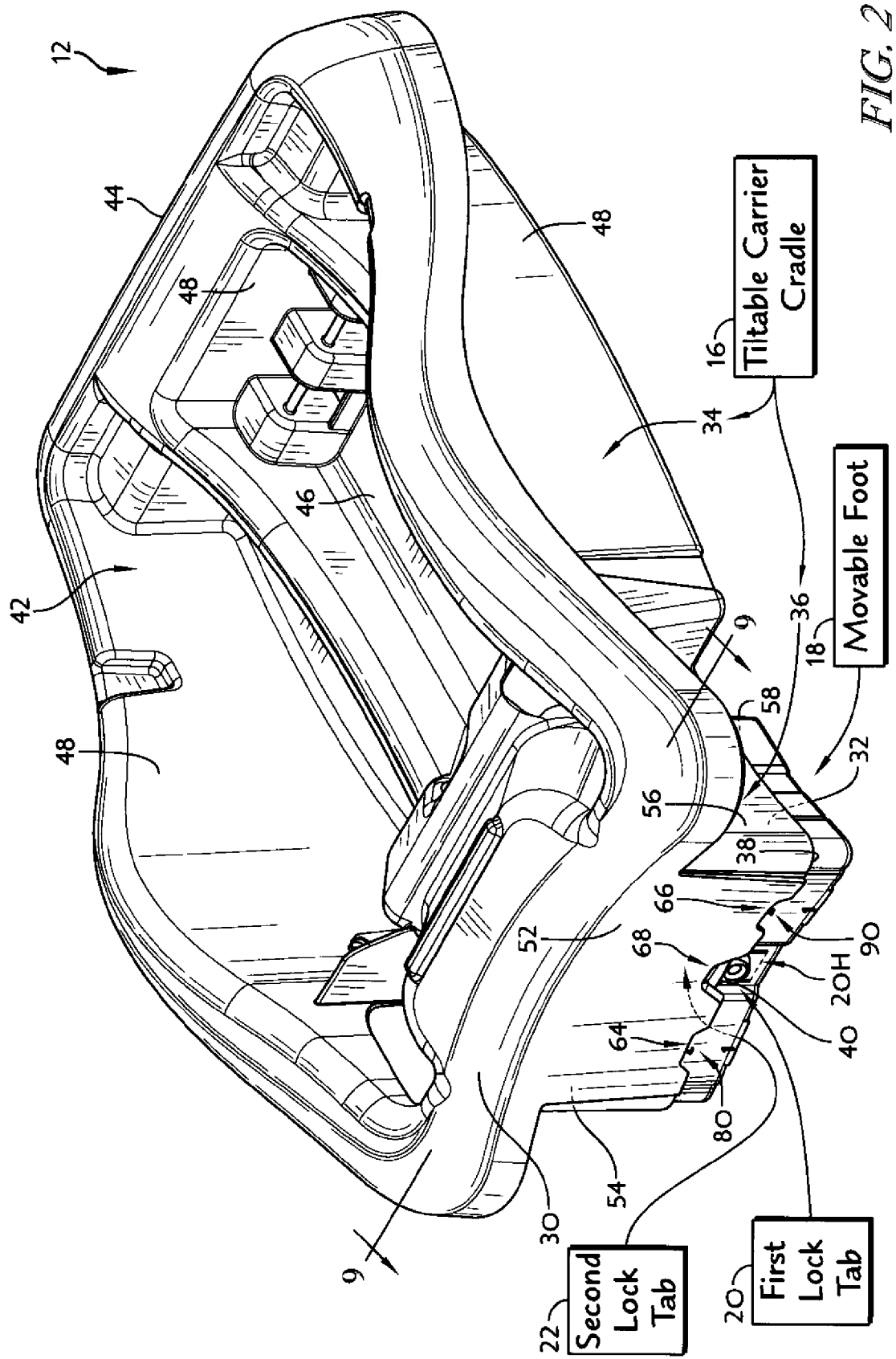

JUVENILE VEHICLE SEAT WITH ADJUSTABLE BASE

PRIORITY CLAIM

This application claims priority under 35 U.S.C. §119(e) to U.S. Provisional Application Ser. No. 61/801,192, filed Mar. 15, 2013, and U.S. Provisional Application Ser. No. 61/907,850, filed Nov. 22, 2013, which are both expressly incorporated by reference herein.

BACKGROUND

The present disclosure relates to child restraints and, in particular, to a juvenile vehicle seat. More particularly, the present disclosure relates to a base configured to adjust the tilt angle of an infant carrier included in a juvenile vehicle seat relative to an underlying passenger seat.

SUMMARY

According to the present disclosure, a child restraint includes an adjustable base adapted to adjust the tilt angle of an infant carrier received in the adjustable base relative to an underlying passenger seat so that the infant carrier can be leveled relative to a vehicle floor. The base includes a carrier cradle that receives the infant carrier and a movable foot that moves into and out of a downwardly facing foot-receiving cavity formed along a foot end of the carrier cradle so that the foot end of carrier cradle and the infant carrier is lowered or raised relative to the underlying passenger seat.

In illustrative embodiments, the child restraint includes a foot-position latch adapted to hold the movable foot in a selected position relative to the carrier cradle when the movable foot is pulled out of the foot-receiving cavity. The foot-position latch is coupled to the movable foot and engages the carrier cradle automatically when a caregiver pulls the movable foot out of the foot-receiving cavity to block the movable foot from moving back into the foot-receiving cavity. The foot-position latch disengages the carrier cradle when a caregiver presses on the foot-position latch to allow the movable foot to move back into the foot-receiving cavity.

In some embodiments, the carrier cradle is formed to include a downwardly-facing tab-engagement surface arranged along a bottom edge of the carrier cradle and the foot-position latch includes a pair of lock tabs that engage the tab-engagement surface to block the movable foot from moving back into the foot-receiving cavity of the carrier cradle. A first lock tab included in the foot-position latch is coupled to the movable foot for movement about a first living hinge and pivots outwardly to engage the tab-engagement surface when the movable foot is pulled out from the retracted-storage position to a partially-extended position. A second lock tab included in the foot-position latch is coupled to the movable foot for movement about a second living hinge and pivots outwardly to engage the tab-engagement surface when the movable foot is pulled out from the retracted-storage position to a fully-extended position.

In other embodiments, the carrier cradle is formed to include an aperture and a downwardly-facing tab-engagement surface arranged below the aperture along a bottom edge of the carrier cradle. In such embodiments, the foot-position latch includes a single lock tab coupled to the movable foot for movement about a living hinge. The single lock tab is arranged to engage the carrier cradle around the aperture or along the downwardly-facing tab-engagement surface. When the movable foot is in a retracted-storage position, the lock tab pivots outwardly about the living hinge to engage the carrier cradle around the aperture to block the movable foot from moving into or out of the foot-receiving cavity of the carrier cradle. When the movable foot is pulled out from the refracted-storage position to an extended position, the lock tab pivots outwardly about the living hinge to engage the downwardly-facing tab-engagement surface to block the movable foot from moving back into the foot-receiving cavity of the carrier cradle.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a perspective view of the adjustable base of FIG. 1A showing the carrier cradle, the movable foot, and the lock tabs included in the adjustable base and showing that a caregiver has moved the movable foot relative to the carrier cradle to assume a partially-extended position to establish a partially-tilted position of the carrier cradle;

FIG. 3A is a side elevation view of the child restraint of FIG. 1A mounted on the passenger seat showing the movable foot in the retracted-storage position in which it lies mostly in the foot-receiving cavity to establish the untilted position of the carrier cradle so that the carrier cradle and the detachable infant carrier are supported generally parallel to the seat bench;

FIG. 3B is a view similar to FIG. 3A showing the movable foot in the partially-extended position in which it extends partway out of the foot-receiving cavity to establish the partially-tilted position of the carrier cradle so that carrier cradle and the detachable infant carrier are supported at a first angle relative to the seat bench;

FIG. 3C is a view similar to FIGS. 3A and 3B showing the movable foot in the fully-extended position in which it extends mostly out of the foot-receiving cavity to establish the fully-tilted position of the carrier cradle so that carrier cradle and the detachable infant carrier are supported at a second angle relative to the seat bench;

DETAILED DESCRIPTION

Figure 1A:
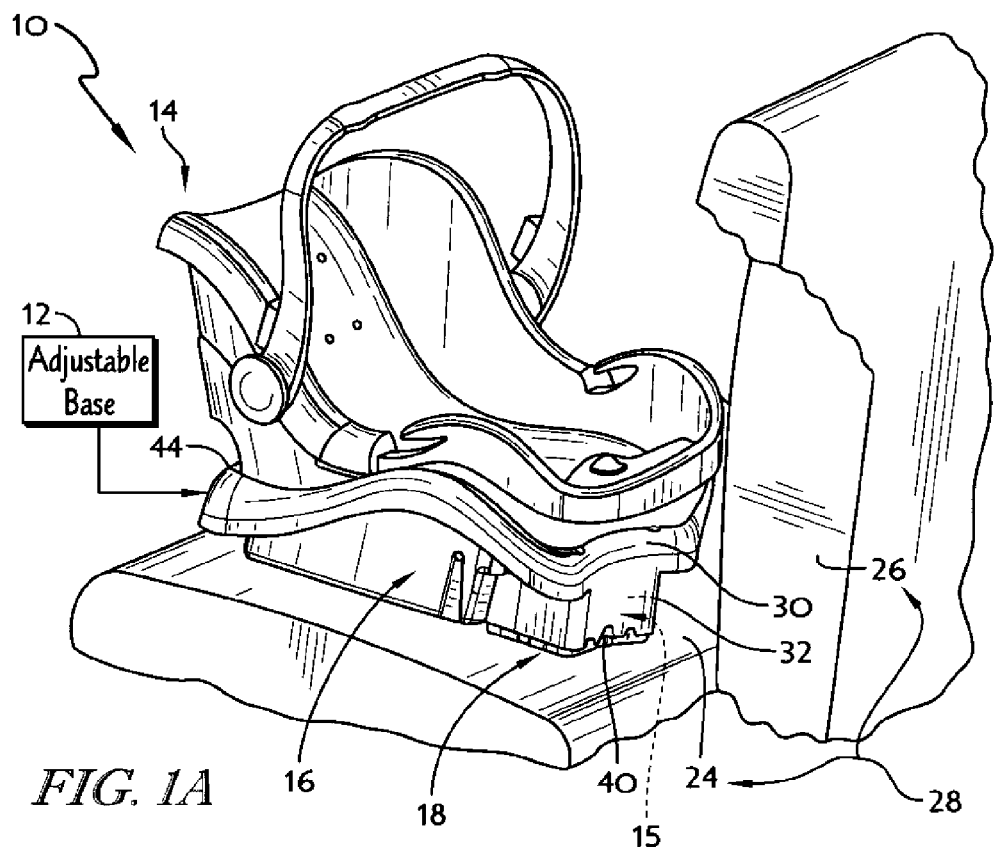
FIG. 1A is a perspective view of a child restraint mounted on a passenger seat showing that the child restraint includes an adjustable base supported on a seat bench included in the passenger seat and a detachable infant carrier received in the adjustable base and arranged to face a seat back included in the passenger seat and showing that the adjustable base includes a carrier cradle, a movable foot mounted for up-and-down movement relative to the carrier cradle from a retracted-storage position to establish an untilted position of the carrier cradle (as shown in FIG. 1A) to a fully-extended to establish a fully-tilted position of the carrier cradle (as shown in FIG. 1B), and a foot-position latch having a first lock tab and a second lock tab for maintaining the movable foot in a selected position so that the detachable infant carrier can be leveled when the child restraint is used with various passenger seats having seat benches that extend at different incline angles relative to a corresponding vehicle floor.
Figure 1B:
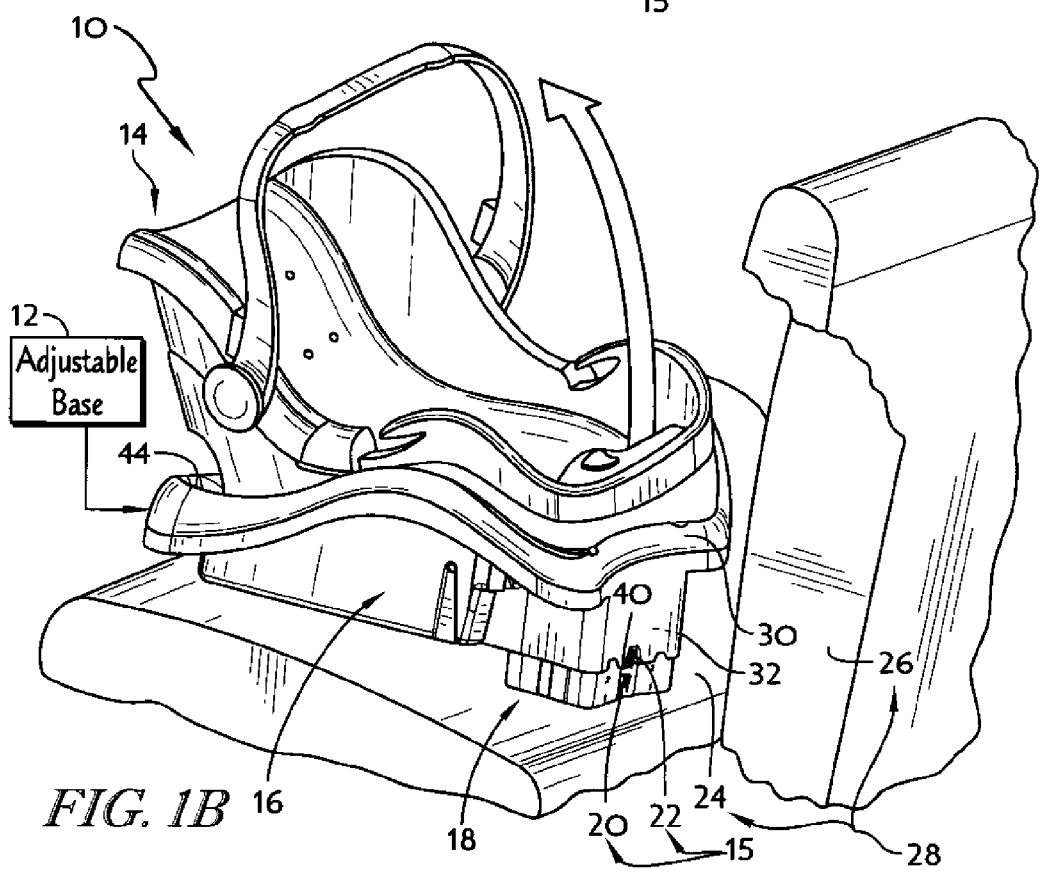
FIG. 1B is a perspective view similar to FIG. 1A of the child restraint showing that a caregiver has moved the movable foot relative to the carrier cradle to the fully-extended position in which the movable foot extends mostly out of the foot-receiving cavity to establish the fully-tilted position of the carrier cradle and showing that the lock tabs are coupled to the movable foot and are arranged to mate with the carrier cradle to provide lock means for retaining the carrier cradle in the fully-tilted position so that the detachable infant carrier received in the carrier cradle is maintained in a selected position relative to a vehicle floor.
Figure 8:
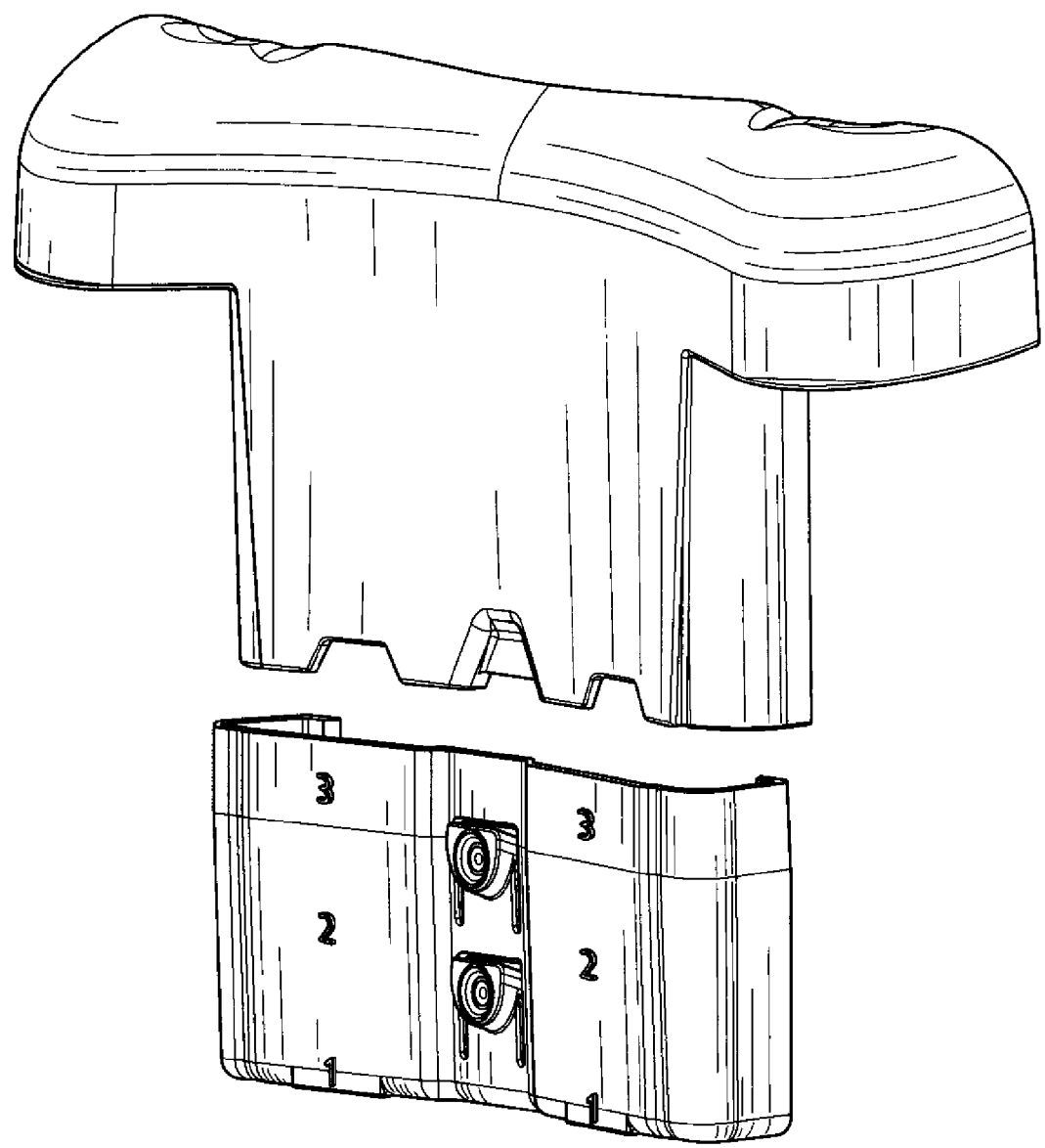
FIG. 8 is a front perspective view of a portion of the carrier cradle and a portion of the movable foot included in the base showing that the carrier cradle includes a foot receiver formed to include a downwardly facing tab-engaging surface arranged to mate with either the first lock tab coupled to the movable foot to establish the partially elevated position of the carrier cradle as suggested in FIGS. 2 and 3B or the second lock tab coupled to the movable foot to establish the fully elevated position of the carrier cradle as suggested in FIGS. 1B and 3C.
Figure 9:
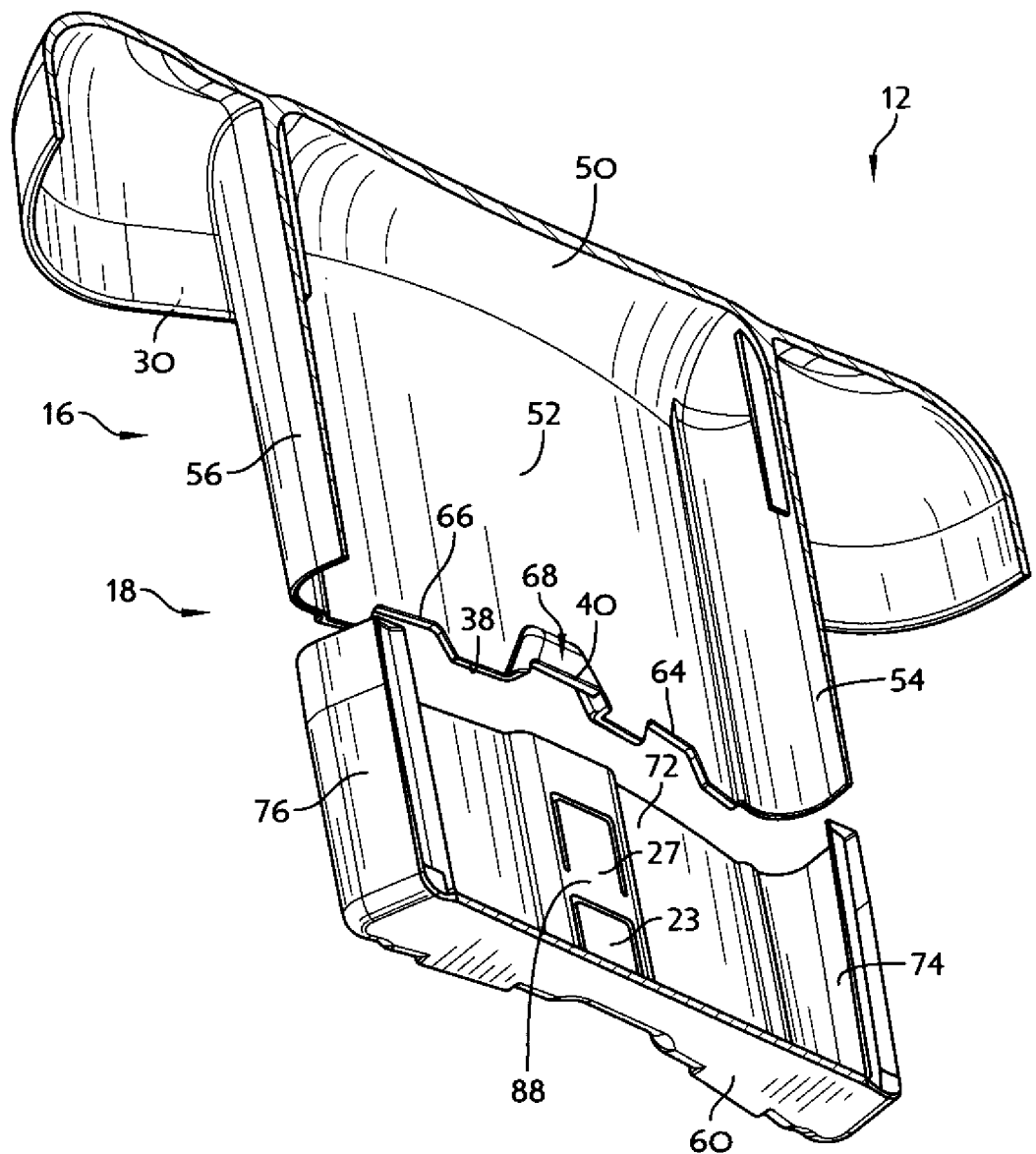
FIG. 9 is a rear perspective view of a portion of the carrier cradle and a portion of the movable foot included in the base similar to FIG. 8 showing that the first lock tab and the second lock tab are formed by inverted U-shaped slots formed in the first side wall of the movable foot.
Figure 10:
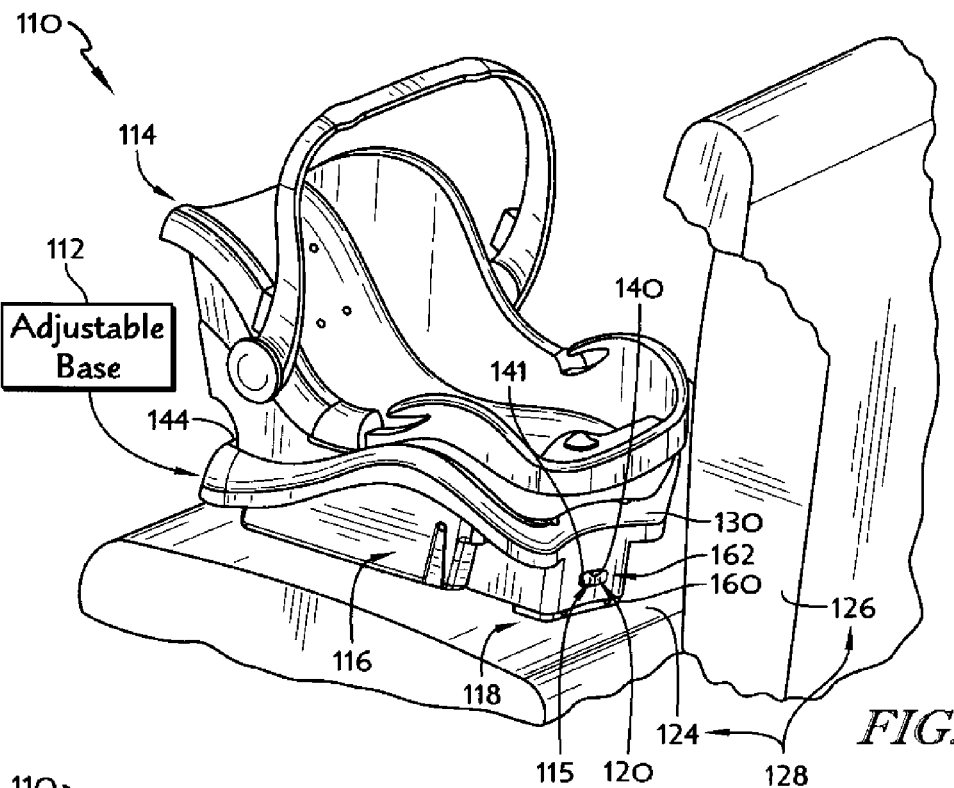
FIG. 10 is a perspective view of another embodiment of a child restraint including an adjustable base supported on a seat bench included in the passenger seat and a detachable infant carrier received in the adjustable base and arranged to face the seat back included in the passenger seat and showing that the adjustable base includes a carrier cradle, a movable foot mounted for up-and-down movement relative to the carrier cradle from a retracted-storage position to establish an untilted position of the carrier cradle (as shown in FIG. 10) to an extended position to establish a tilted position of the carrier cradle (as shown in FIG. 11), and a foot-position latch including a lock tab for maintaining the movable foot in a selected position so that the detachable infant carrier can be leveled when the child restraint is used with various passenger seats having seat benches that extend at different incline angles relative to a corresponding vehicle floor.

A first illustrative child restraint 10 for use in a vehicle is shown in FIGS. 1-9 and a second illustrative child restraint 110 for use in a vehicle is shown in FIGS. 10-17. Each child restraint 10, 110 includes an adjustable base 12, 112 adapted for installation on a passenger seat 28 and an infant carrier 14, 114 coupled removably to adjustable base 12, 112 as shown in FIGS. 1 and 10. Each adjustable base 12, 112 includes a carrier cradle 16, 116 adapted to receive a corresponding infant carrier 14, 114, a movable foot 18, 118 coupled to carrier cradle 16, 116, and a foot-position latch 15, 115. Movable feet 18, 118 are mounted to corresponding carrier cradles 16, 116 for movement into and out of foot-receiving cavities 32, 132 formed in carrier cradles 16, 116 to allow a caregiver to change the tilt angle of carrier cradles 16, 116 on an underlying passenger seat 28 as suggested in FIGS. 3A-3C, 10, and 11. Foot-position latches 15, 115 provide lock means for maintaining movable feet 18, 118 in a selected position relative to carrier cradles 16, 116 to hold the corresponding carrier cradle 16, 116 at a desired tilt angle relative to underlying passenger seat 28 so that an infant carrier 14, 114 received in a carrier cradle 16, 116 can be leveled relative to a vehicle floor when child restraint 10 is used with various passenger seats 28.

Figure 3A:
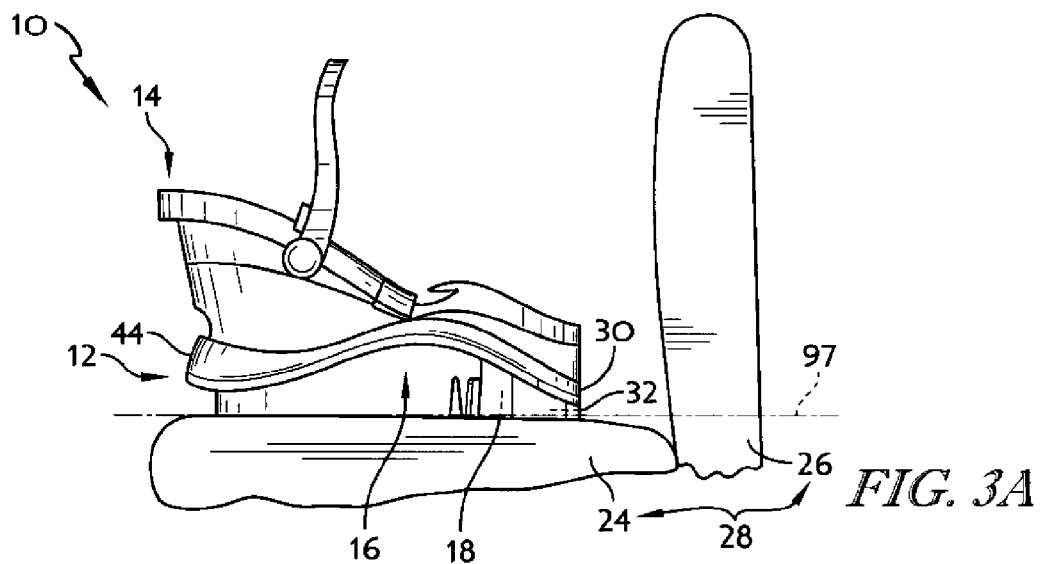
FIGS. 3A-3C are a series of side elevation views of the child restraint mounted on the passenger seat showing the adjustable base included in the child restraint moved from the untilted position shown in FIG. 3A, to the partially-tilted position shown in FIG. 3B, and finally to the fully-tilted position shown in FIG. 3C.
Figure 3B:
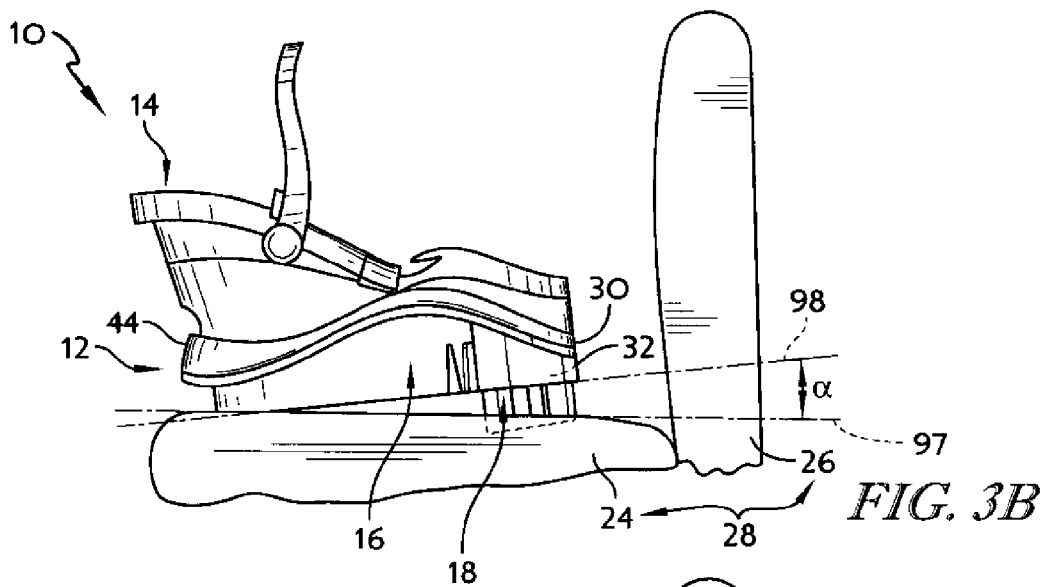
Figure 3C:
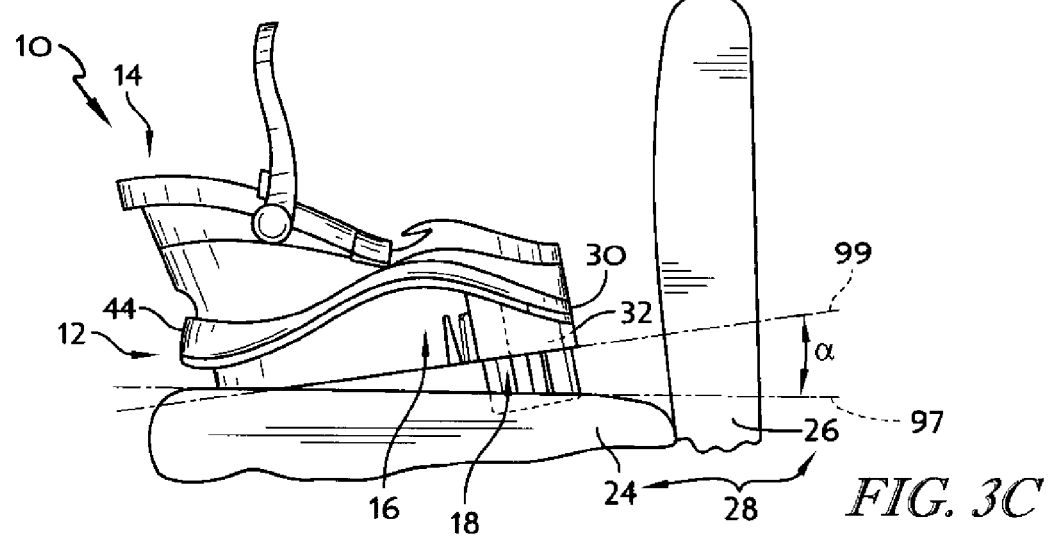
Figure 4:
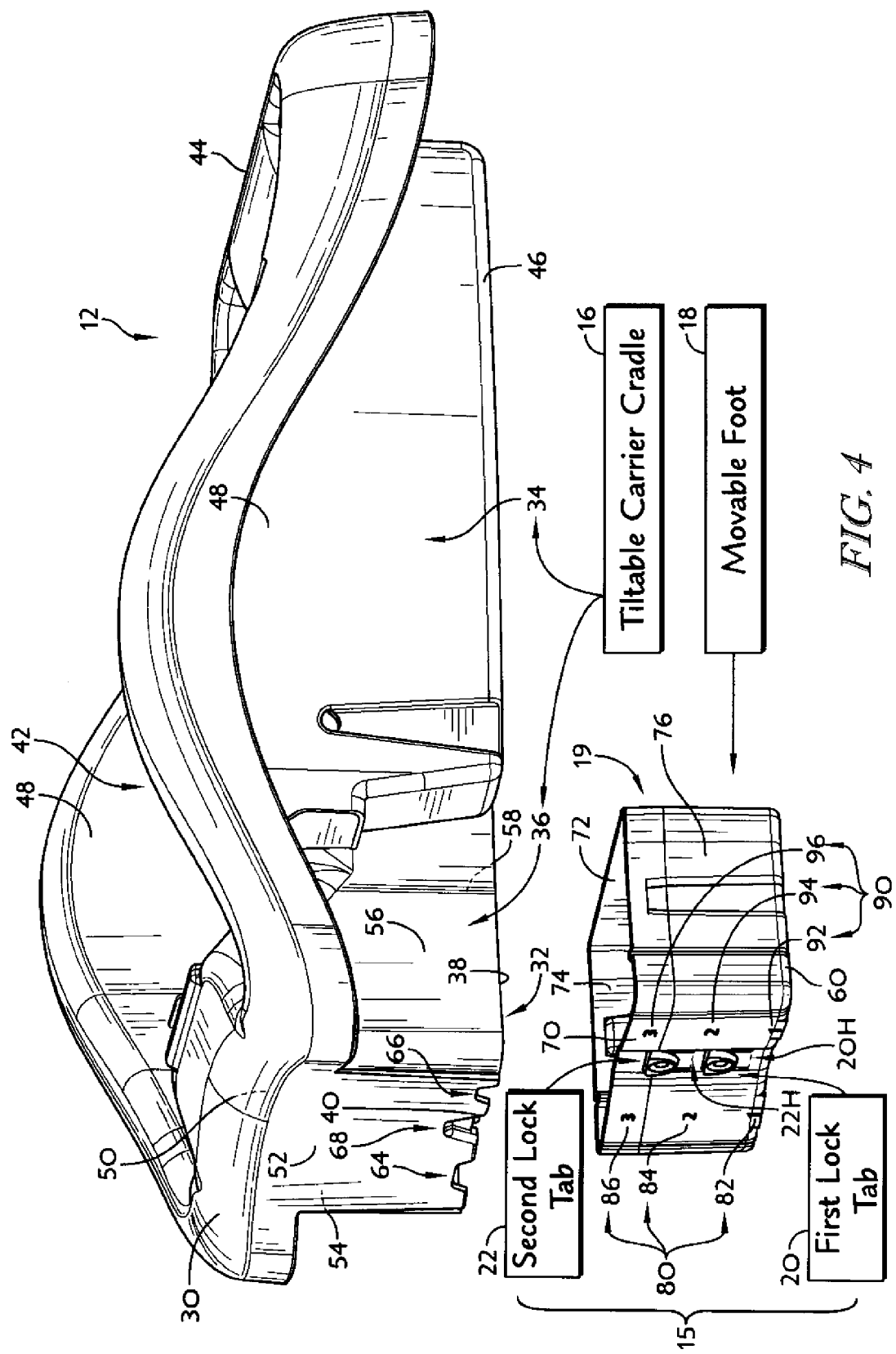
FIG. 4 is an exploded view of the adjustable base included in the child restraint of FIGS. 1A and 1B showing the movable foot removed from a foot-receiving cavity formed in the carrier cradle, showing that the movable foot includes a floor and a plurality of side walls arranged to extend up from the floor, and showing that the first and second lock tabs are coupled to a first side wall of the movable foot by living hinges to pivot relative to the first side wall.

In one illustrative embodiment shown in FIGS. 1-9, foot-position latch 15 includes first and second lock tabs 20, 22 as shown in FIG. 4. First and second lock tabs 20, 22 either block or allow movement of movable foot 18 into foot-receiving cavity 32 formed in carrier cradle 16. By blocking movement of movable foot 18 into foot-receiving cavity 32, first and second lock tabs 20, 22 retain movable foot 18 in a selected position relative to carrier cradle 16 as shown in FIGS. 3B-3C.

Figure 11:
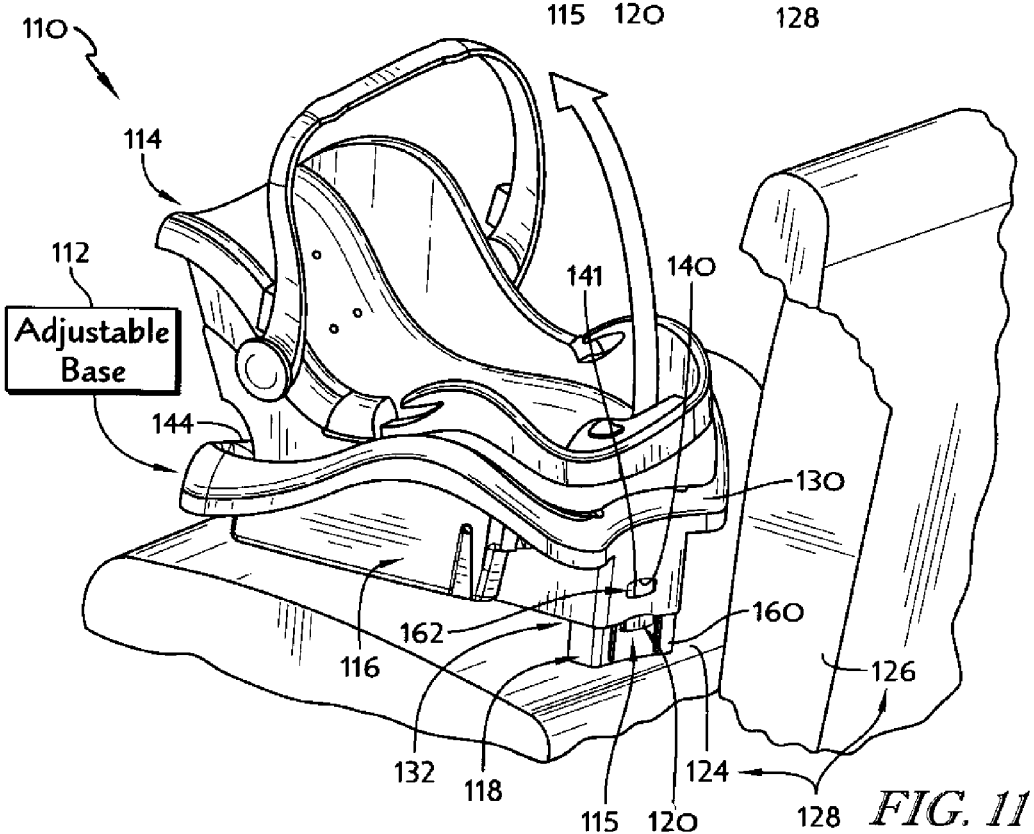
FIG. 11 is a perspective view similar to FIG. 10 of the child restraint showing that a caregiver has moved the movable foot relative to the carrier cradle to the extended position in which the movable foot extends partway out of the foot-receiving cavity to establish the tilted position of the carrier cradle and showing that the lock tab is coupled to the movable foot at a living hinge and mates with the carrier cradle to provide lock means for retaining the carrier cradle in the tilted position so that the detachable infant carrier received in the carrier cradle is maintained in a selected position relative to the passenger seat.
Figure 12:
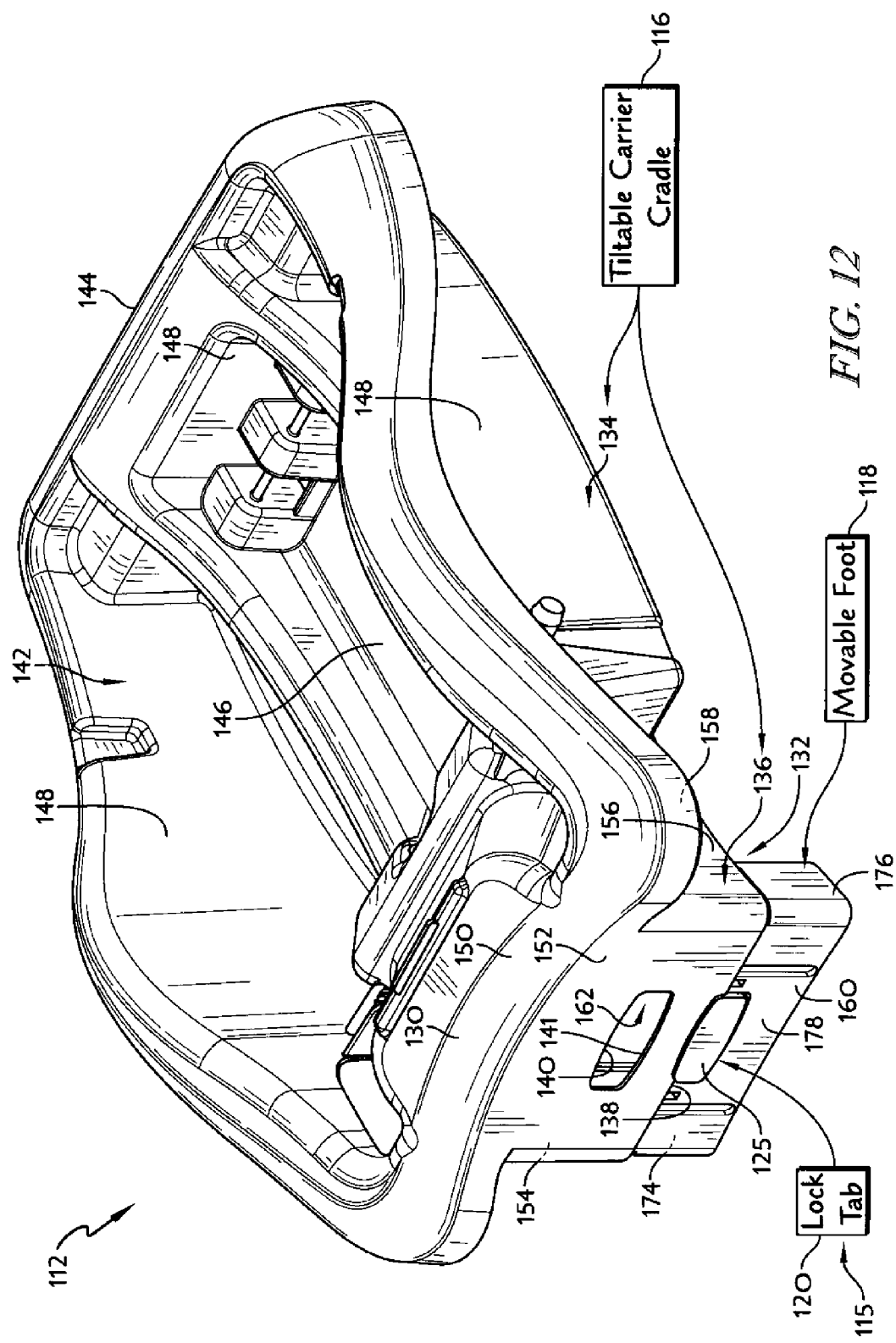
FIG. 12 is a perspective view of the adjustable base of FIGS. 10 and 11 showing the carrier cradle, the lock tab, and the movable foot included in the adjustable base and showing that a caregiver has moved the foot relative to the carrier cradle to assume the extended position in which the movable foot extends partway out of the foot-receiving cavity to establish the tilted position of the carrier cradle.
Figure 13:
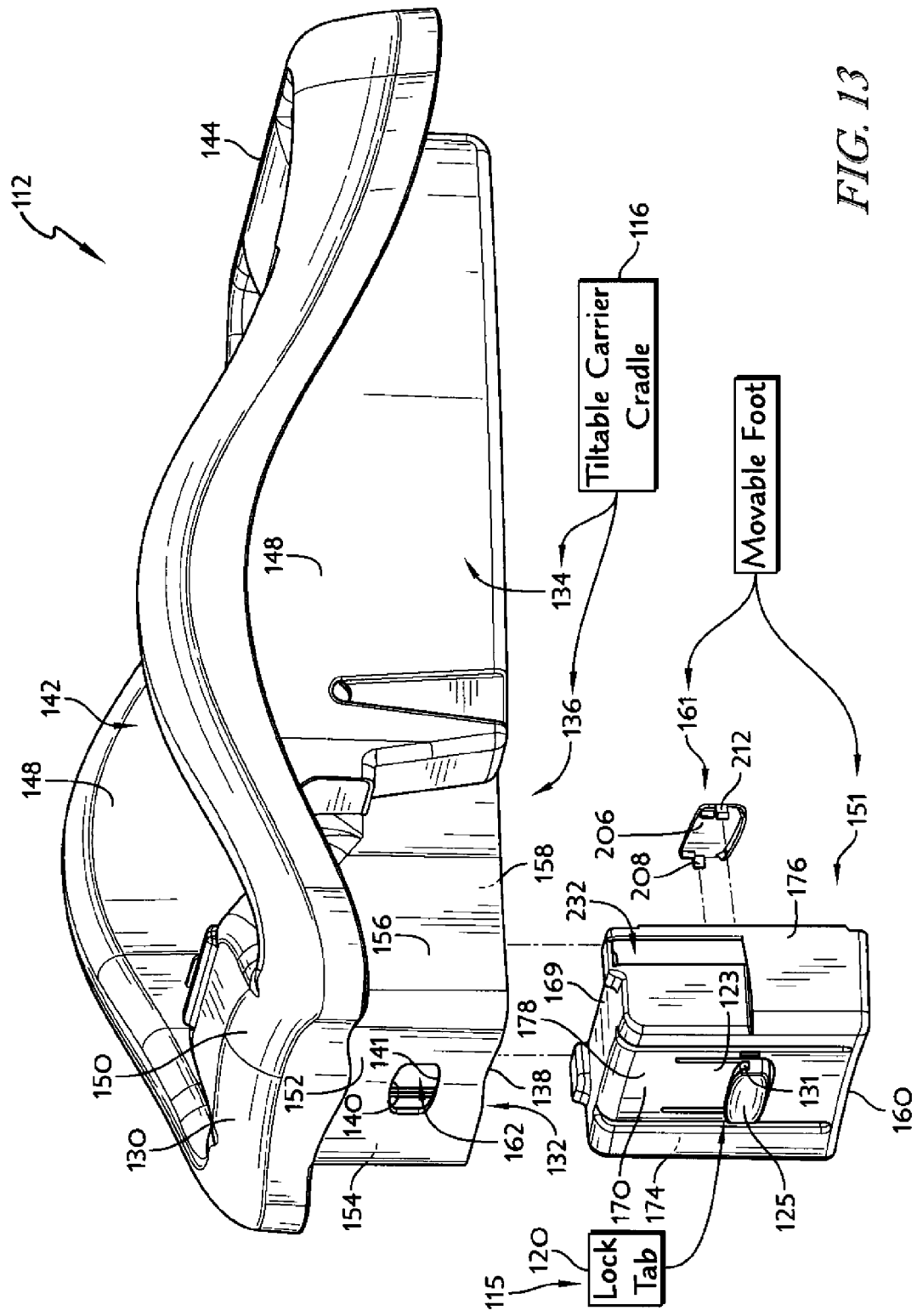
FIG. 13 is an exploded view of the adjustable base included in the child restraint of FIGS. 10 and 11 showing that the movable foot includes a floor, a ceiling, a plurality of side walls arranged to extend up from the floor to the ceiling, and a tab panel coupled to the first side wall to block overtravel of showing that the lock tab and the lock tab is coupled to a first side wall of the movable foot at the living hinge to pivot relative to the first side wall.

In another illustrative embodiment shown in FIGS. 10-17, foot-position latch 115 includes a single lock tab 120 as shown in FIG. 13. Lock tab 120 either blocks or allows movement of movable foot 118 out of foot-receiving cavity 132 formed in carrier cradle 116. By blocking movement of movable foot 118 into foot-receiving cavity 132, lock tab 120 retains movable foot 118 in a selected extended position relative to carrier cradle 116 when adjustable base 112 is supported on passenger seat 28 as shown in FIGS. 10 and 11. Lock tab 120 also blocks or allows movement of movable foot 118 back into foot-receiving cavity 132 when movable foot 118 is mostly received in the foot-receiving cavity 32. By blocking movement of movable foot 118 into or out of foot-receiving cavity 132, lock tab 120 holds adjustable base 112 together for storage or transportation between vehicles as suggested in FIG. 10.

Child restraint 10 of FIGS. 1-9 illustratively includes adjustable base 12 and infant carrier 14 coupled removably to adjustable base 12 as shown in FIG. 2. Adjustable base 12 is adapted to be installed on a passenger seat 28 included in a vehicle and provides means for adjusting the tilt angle of infant carrier 14 relative to passenger seat 28 as suggested in FIGS. 3A-3C. Infant carrier 14 is adapted to support and restrain a child in the vehicle when coupled to adjustable base 12.

Adjustable base 12 includes carrier cradle 16, movable foot 18, and foot-position latch 15 as shown, for example, in FIG. 2. Carrier cradle 16 is formed to include an upwardly-facing carrier-receiving cavity 42 sized to receive infant carrier 14 and a downwardly facing foot-receiving cavity 32 sized to receive movable foot 18. Movable foot 18 is mounted for up-and-down vertical movement into and out of foot-receiving cavity 32 which is arranged at a foot end 30 of carrier cradle 16. Movement of movable foot 18 up-and-down relative to carrier cradle 16 allows a caregiver to change a tilt angle α defined between a bottom surface 38 included in carrier cradle 16 and underlying seat bench 24 of passenger seat 28 as shown in FIGS. 3A-3C. Foot-position latch 15 provides lock means for retaining movable foot 18 in a selected position relative to carrier cradle 16.

Carrier cradle 16 includes a carrier receiver 34 and a foot receiver 36 coupled to carrier receiver 34 as shown, for example, in FIG. 2. Carrier receiver 34 is formed to include an upwardly facing carrier-receiving cavity 42 sized to receive removable infant carrier 14. Foot receiver 36 is coupled to carrier receiver 34 and is formed to include downwardly-facing foot-receiving cavity 32. Foot receiver 36 also forms a downwardly facing tab-engaging surface 40 arranged to face downwardly toward seat bench 24 of passenger seat 28.

Movable foot 18 is mounted for up-and-down movement into and out of foot-receiving cavity 32 as shown in FIG. 2. First and second lock tabs 20, 22 are coupled to movable foot 18 to move therewith and are arranged to mate with downwardly facing tab-engaging surface 40 of carrier cradle 16 to retain foot end 30 of carrier cradle 16 in a selected elevated position relative to the underlying seat bench 24 of passenger seat 28.

A caregiver is able to selectively position carrier cradle 16 and, thus, infant carrier 14 relative to seat bench 24 by moving movable foot 18 in foot-receiving cavity 32 to change tilt angle α as shown in FIGS. 3A-3C. Movable foot 18 is configured to move from a retracted-storage position arranged mostly inside foot-receiving cavity 32 (as shown in FIG. 3A), to a partially-extended position extending partway out of foot-receiving cavity 32 (as shown in FIG. 3B), and further to a fully-extended position extending mostly out of foot-receiving cavity 32 (as shown in FIG. 3C). When movable foot 18 is in the retracted-storage position, foot end 30 of carrier cradle 16 is about level with foot end 44 of carrier cradle 16 and tilt angle α of carrier cradle 16 is about zero degrees. When movable foot 18 is in the partially-extended position, foot end 30 of carrier cradle 16 is lifted and tilt angle α of carrier cradle 16 is about 4.6 degrees. When movable foot 18 is in the fully-extended position, foot end 30 of carrier cradle 16 is lifted further above foot end 44 of carrier cradle 16 and tilt angle α of carrier cradle 16 is about 9 degrees.

Foot-position latch 15 illustratively includes a pair of lock tabs 20, 22 that engage tab-engagement surface 40 to block movable foot 18 from moving back into foot-receiving cavity 32 of carrier cradle 16 as shown in FIG. 4. A first lock tab 20 is coupled to movable foot 18 for movement about a first living hinge 20H and pivots outwardly to engage tab-engagement surface 40 when the movable foot is pulled out from the retracted-storage position to the partially-extended position as shown in FIG. 2. A second lock tab 22 is coupled to movable foot 18 for movement about a second living hinge 22H and pivots outwardly to engage tab-engagement surface 40 when movable foot 18 is pulled out from the retracted-storage position to the fully-extended position. Each lock tab 20, 22 pivots inwardly about its corresponding living hinge 20H, 22H when pressed by a caregiver so that each lock tab 20, 22 may be disengaged from tab-engagement surface 40 allowing movable foot 18 to be pushed back into foot-receiving cavity 32.

Carrier receiver 34 includes a floor 46 and a number of side walls 48 coupled to floor 46 that are arranged to extend upwardly from floor 46 to define infant carrier-receiving cavity 42 as shown in FIG. 4. Floor 46 is configured to be positioned on seat bench 24 to support carrier cradle 16 when adjustable base 12 is positioned on seat bench 24.

Figure 5:
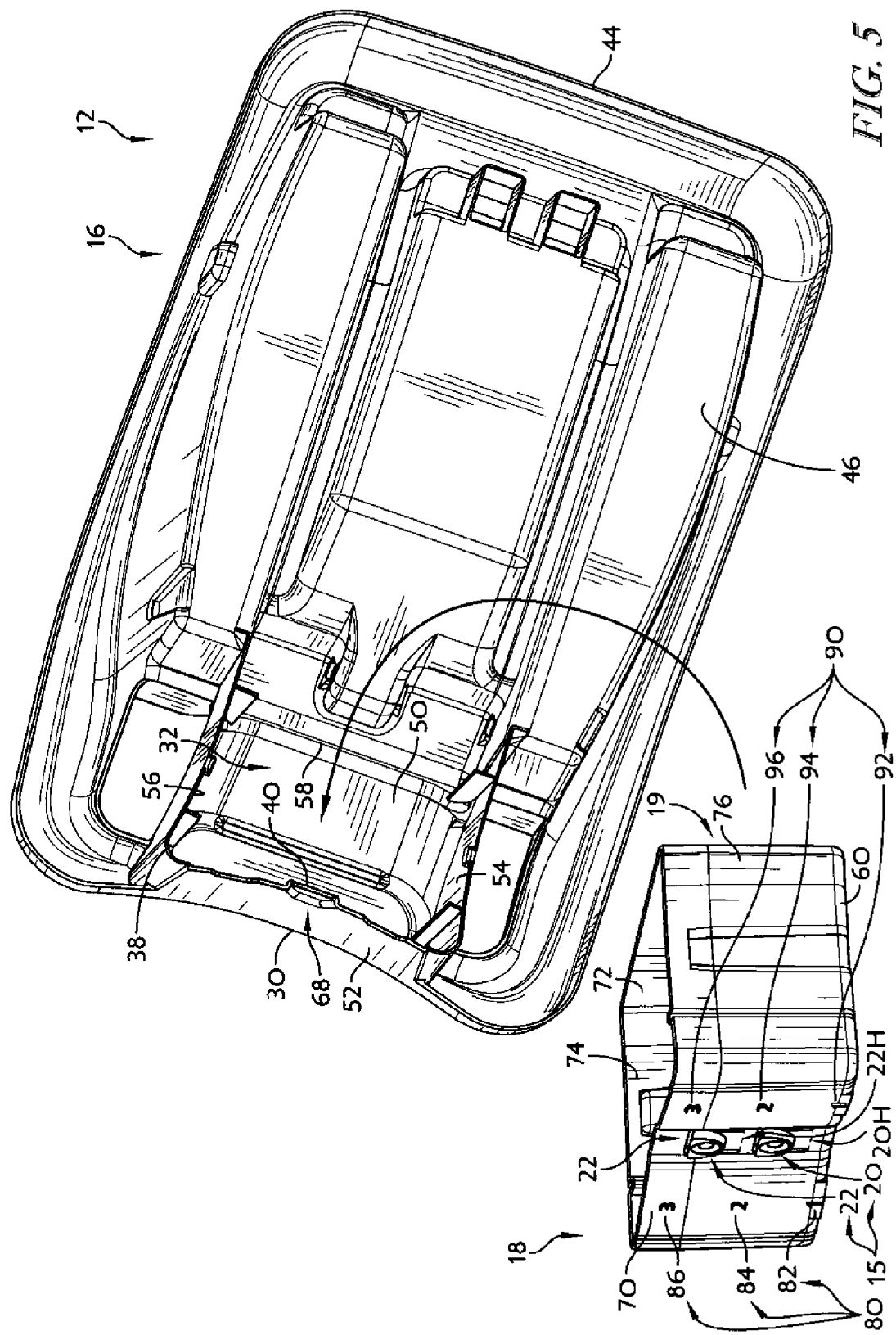
FIG. 5 is a perspective view of the adjustable base of FIG. 2 showing the movable foot and the underside of the carrier cradle and suggesting that the movable foot may be positioned in the foot-receiving cavity formed in the carrier cradle.
Figure 6:
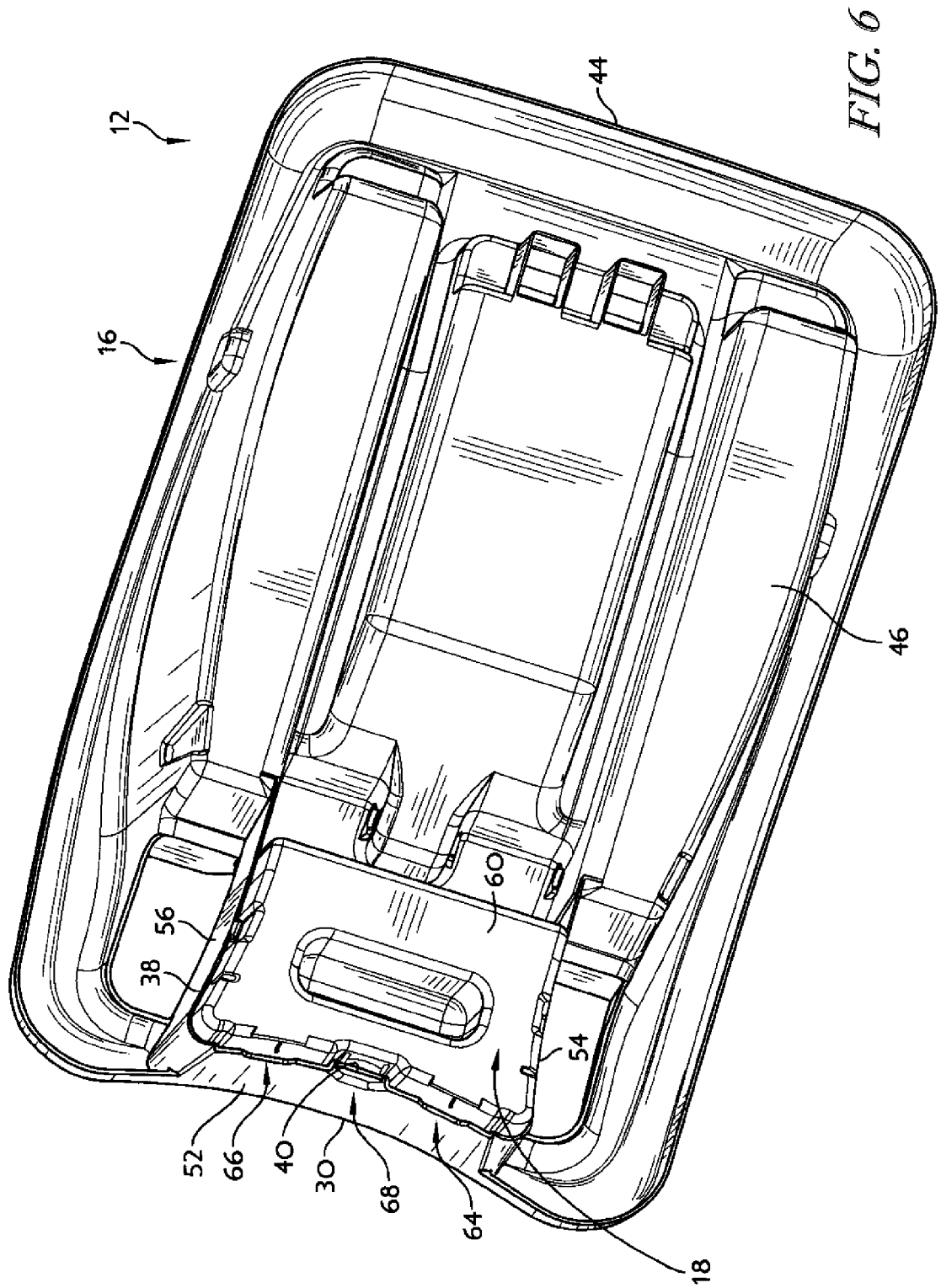
FIG. 6 is a perspective view similar to FIG. 5 showing the movable foot positioned in the foot-receiving cavity formed in the carrier cradle.

Foot receiver 36 includes a ceiling 50 and a rear panel 52, a left panel 54, a right panel 56, and a front panel 58 coupled to ceiling 50 as shown in FIGS. 4-6. Panels 52, 54, 56, and 58 extend downwardly from ceiling 50 toward bottom surface 38 of foot receiver 36. Bottom surface 38 is configured to lie in one of a number of planes and cooperates with seat bench 24 to define tilt angle α.

Ceiling 50 and panels 52, 54, 56, 58 cooperate to define foot-receiving cavity 32 as shown in FIG. 4. Foot-receiving cavity 32 is sized to receive movable foot 18 therein. In the illustrative embodiment, foot-receiving cavity 32 is sized to receive all of movable foot 18, except for a foot floor 60 of movable foot 18 that extends beyond bottom surface 38 and out of foot-receiving cavity 32 as shown in FIG. 3A.

Figure 7:
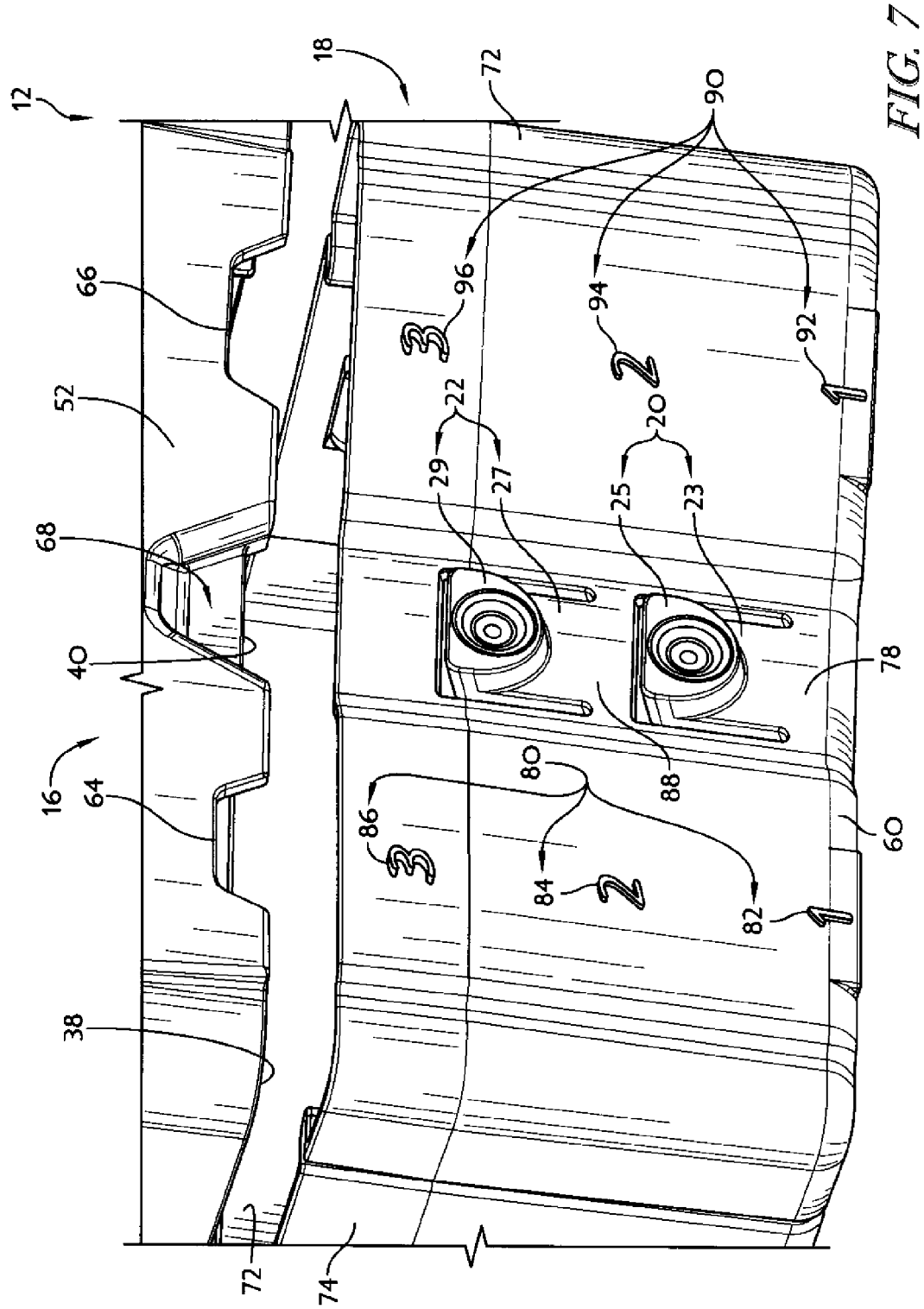
FIG. 7 is an enlarged perspective view of a front side of the movable foot and a portion of the carrier cradle showing the first and second lock tabs are coupled to the front wall of the movable foot and the movable foot includes tilt markings "1," "2," and "3" which are exposed when the movable foot is positioned relative to the carrier cradle to indicate a tilt level of carrier cradle.

Rear panel 52 is formed to include a shell-support flange 68 which forms downwardly facing tab-engaging surface 40 and a recess means for exposing at least one tilt-level indicator formed in movable foot 18 as shown in FIG. 4. In the illustrative embodiment, recess means includes a first indicator window 64 and a second indicator window 66 as shown in FIGS. 7 and 8. First and second indicator windows 64, 66 extend upwardly from bottom surface 38 to form openings in rear panel 52.

Shell-support flange 68 is formed in rear panel 52 as shown in FIG. 4. Shell-support flange 68 is positioned proximate to bottom surface 38 and is recessed in foot-receiving cavity 32 towards front panel 58 as shown in FIG. 9. First indicator window 64 is arranged to lie in a spaced apart relation to second indicator window 66 to locate shell-support flange 68 therebetween.

Movable foot 18 is configured to be received in foot-receiving cavity 32 and to position carrier cradle 16 relative to seat bench 24 as shown in FIG. 4. Movable foot 18 includes foot floor 60 and a rear panel 70, a front panel 72, left panel 74, and right panel 76 extending upwardly from foot floor 60 as shown in FIG. 4. Rear panel 70 is formed to include a first set of tilt-level indicators 80 and a second set of tilt-level indicators 90. In the illustrative embodiment, first and second sets of tilt-level indicators 80, 90 include a first tilt-level indicator 82, 92, a second tilt-level indicator 84, 94, and a third tilt-level indicator 86, 96 respectively. First and second set of tilt-level indicators 80, 90 are arranged to lie in a spaced apart relation to one another to locate the first and second lock tabs 20, 22 therebetween as shown in FIGS. 7 and 8.

First tilt-level indicator 82, 92 are associated with the retracted storage position, second tilt-level indicators 84, 94 are associated with the first extended cradle-tilting position, and third tilt-level indicators 86, 96 are associated with the second extended cradle-tilting position as suggested in FIG. 4. In the illustrative embodiment, first tilt-level indicators 82, 92 are formed into the shape of the number "1," second tilt-level indicators 84, 94 are formed into the shape of the number "2," and third tilt-level indicators 86, 96 are formed into the shape of the number "3."

First set of tilt-level indicators 80 is aligned with first indicator window 64 and second set of tilt-level indicators 90 is aligned with second indicator window 66 as shown in FIG. 7. Tilt-level indicators 82, 84, 86 are spaced apart from each other vertically such that an indicator of first set of tilt-level indicators 80 associated with the current position of movable foot 18 is exposed in first indicator window 64 to communicate the position of carrier cradle 16 to the caregiver. Likewise, tilt-level indicators 92, 94, 96 are spaced apart from each other vertically such that an indicator of second set of tilt-level indicators 90 associated with the current position of movable foot 18 is exposed in second indicator window 66 to communicate the position of carrier cradle 16 to the caregiver. For example, when movable foot 18 is in the first extended cradle-tilting position, second tilt-level indicators 84, 94, associated with the first extended cradle-tilting position, are exposed in indicator windows 64, 66 to communicate to a caregiver that carrier cradle 16 is tilted in the first elevated position.

First and second lock tabs 20, 22 are formed in rear panel 70 of movable foot 18 as shown, for example, in FIGS. 6 and 7. Movable foot 18 and first and second lock tabs 20, 22 cooperate to form a monolithic foot unit 19 as shown in FIG. 9. In other embodiments, movable foot 18, first lock tab 20, and second lock tab 22 are formed separately and coupled together to form foot unit 19.

First lock tab 20 includes an elastic flange 23 coupled to rear panel 70 at living hinge 20H and a button 25 extending outwardly from elastic flange 23 as shown in FIG. 7. Button 25 and elastic flange 23 cooperate such that when a caregiver presses button 25, elastic flange 23 flexes inwardly. Button 25 engages downwardly facing tab-engaging surface 40 of shell-support flange 68 when movable foot is in the first extended cradle tilt position. A caregiver may press button 25 to cause elastic flange 23 to pivot inwardly disengaging shell-support flange 68 and simultaneously press movable foot upward to position movable foot 18 further inside foot-receiving cavity 32. Rear panel 52 prevents elastic flange 23 from pivoting outwardly until first lock tab 20 is pulled out of foot-receiving cavity 32.

Second lock tab 22 includes an elastic flange 27 coupled to rear panel 70 at living hinge 22H and a button 29 extending outwardly from elastic flange 27 as shown in FIG. 7. Button 29 engages downwardly facing tab-engaging surface 40 of shell-support flange 68 when movable foot is in the second extended cradle tilt position. A caregiver may press button 29 to cause elastic flange 27 to pivot inwardly disengaging shell-support flange 68 and simultaneously press movable foot upward to position movable foot 18 further inside foot-receiving cavity 32. Rear panel 52 prevents elastic flange 27 from pivoting outwardly until second lock tab 22 is pulled out of foot-receiving cavity 32. First and second lock tabs 20, 22 are recessed toward front panel 72 of movable foot 18 such that buttons 25, 29 do not extend beyond rear panel 52.

First lock tab 20 is coupled to a lower portion of movable foot 18 and associated with the first elevated position of foot end 30 of carrier cradle 16 as shown, for example, in FIG. 3B. Whenever movable foot 18 is moved relative to carrier cradle 16 such that foot end 30 of carrier cradle 16 is raised to reach the first elevated position, first lock tab 20 is moved automatically, to engage an downwardly facing tab-engaging surface 40 of shell-support flange 68 to support foot end 30 of carrier cradle 16 in the first elevated position relative to seat bench 24 underlying adjustable base 12, as suggested in FIG. 3B. First lock tab 20 can be moved inwardly by a caregiver to disengage shell-support flange 68 to free movable foot 18 for up-and-down movement relative to within a foot-receiving cavity 32.

Second lock tab 22 is coupled to an upper portion of movable foot 18 to lie above first lock tab 20 and is associated with the relatively higher second elevated position of carrier cradle 16 as shown, for example, in FIG. 3C.

Whenever movable foot 18 is moved relative to carrier cradle 16 such that foot end 30 of carrier cradle 16 is raised to reach the relatively higher second elevated position, second lock tab 22 is moved automatically, to engage downwardly facing tab-engaging surface 40 of shell-support flange 68 to support carrier cradle 16 in the second elevated position, as suggested in FIG. 3C. Second lock tab 22 can be moved inwardly by a caregiver to disengage shell-support flange 68 to free movable foot 18 for up-and-down movement within foot-receiving cavity 32.

Seat bench 24 lies in a seat plane 97 that is about horizontal relative to ground, as suggested in FIGS. 3A-3C. Adjustable base 12 is supported on seat bench 24 and may be adjusted relative to seat plane 97 by engaging first or second lock tabs 20, 22.

Carrier cradle 16 can assume a horizontally extending or level orientation in which foot end 30 of carrier cradle 16 is untilted as shown, for example, in FIG. 3A. In this untilted position, movable foot 18 lies in the retracted-storage position nearly wholly within foot-receiving cavity 32 formed in foot end 30 of carrier cradle 16. In the retracted-storage position, bottom surface 38 of foot receiver 36 lies in seat plane 97 such that the tilt angle α between bottom surface 38 and seat plane 97 is about zero degrees.

First lock tab 20 is arranged to engage shell-support flange 68 to retain foot end 30 of carrier cradle 16 in a first elevated position automatically whenever movable foot 18 is moved relative to foot receiver 36 to the partially-extended position as suggested in FIG. 3B. When movable foot 18 is in the partially-extended position, bottom surface 38 of foot receiver 36 lies in a first elevated plane 98. First elevated plane 98 is offset to create a tilt angle α of about 4.6 degrees relative to seat plane 97.

Second lock tab 22 is arranged to engage shell-support flange 68 to retain foot end 30 of carrier cradle 16 in a relatively higher second elevated position automatically whenever movable foot 18 is moved relative to foot receiver 36 to the fully-extended position, as suggested in FIG. 3C. When movable foot 18 is moved to the fully-extended position, bottom surface 38 of foot receiver 36 lies in a second elevated plane 99. Second elevated plane 99 is offset to create a tilt angle α of about 9 degrees relative to seat plane 97.

Child restraint 110 at rest on seat bench 24 included in passenger seat 28 is shown in FIGS. 10-17. Child restraint 110 is substantially similar to the child restraint 10 shown in FIGS. 1A-9 and described herein. Accordingly, similar reference numbers in the 100 series indicate features that are common between child restraint 10 and the child restraint 110. The description of child restraint 10 is hereby incorporated by reference to apply to child restraint 110, except in instances when it conflicts with the specific description and drawings of child restraint 110.

Child restraint 110 includes an adjustable base 112 configured to support a detachable infant carrier 114 in a rearwardly facing position facing toward a seat back 26 included in passenger seat 28 as shown in FIG. 10. Adjustable base 112 includes a carrier cradle 116, a movable foot 118, and a foot-position latch 115 as shown in FIG. 13. Movable foot 118 is mounted for movement into and out of foot-receiving cavity 132 to change the tilt angle of carrier cradle 116 on an underlying seat bench 24. Foot-position latch 115 illustratively includes a single lock tab 120 coupled to movable foot 118. Lock tab 120 is adapted to retain movable foot 118 in position relative to carrier cradle 116 so that detachable infant carrier 114 received in carrier cradle 116 is maintained in a selected position relative to seat bench 24 as shown in FIG. 11.

A caregiver is able to selectively position carrier cradle 116 and, thus, infant carrier 114 relative to seat bench 24 by moving movable foot 118 within foot-receiving cavity 132 to change the tilt angle between carrier cradle 116 and seat bench 24 as suggested in FIGS. 10 and 11. In the illustrative embodiment, movable foot 118 is configured to move between a retracted-storage position lying mostly in foot-receiving cavity 132 (shown in FIG. 10) and an extended position extending partway out of foot-receiving cavity 132 (shown in FIG. 11).

When movable foot 118 is in the retracted—storage position, the carrier cradle 116 assumes the untilted (nearly horizontal) position when placed on seat bench 24 as shown in FIG. 10. When movable foot 118 is in the extended position the carrier cradle 116 assumes a tilted position as shown in FIG. 11.

Adjustable base 112 includes carrier cradle 116, movable foot 118 mounted to carrier cradle 116, and lock tab 120 coupled to movable foot 118 at a living hinge 178 as shown in FIG. 12. Carrier cradle 116 includes a carrier receiver 134 and a foot receiver 136 coupled to carrier receiver 134. Movable foot 118 is mounted for up-and-down movement relative to carrier cradle 116 in a foot-receiving cavity 132 formed in foot receiver 136. Lock tab 120 is coupled to movable foot 118 and is arranged to engage a downwardly facing tab-engaging surface 140 formed by foot receiver 136, (shown in FIG. 10) or a bottom surface 138 of foot receiver 136 (shown in FIG. 12) to maintain movable foot 118 in position relative to carrier cradle 116.

Carrier 134 receives infant carrier 114 so that infant carrier 114 moves with carrier receiver 134 when infant carrier 114 as suggested in FIGS. 10 and 11. Carrier receiver 134 includes a floor 146 and a number of side walls 148 coupled to floor 146 that are arranged to extend upwardly from floor 146 to define infant carrier-receiving cavity 142. Floor 146 is configured to be positioned on seat bench 24 to support carrier cradle 116 when adjustable base 112 is positioned on seat bench 24.

Foot receiver 136 is coupled to carrier receiver 134 at a foot end 130 of carrier cradle 116 opposite a head end 144 of carrier cradle 116 as shown in FIG. 13. Foot receiver 136 is configured to receive movable foot 118 for up-and-down movement and to support infant carrier 114 on seat bench 24. Foot receiver 136 includes a ceiling 150, a front panel 158, a left panel 154, a right panel 156, and a rear panel 152 coupled to ceiling 150 as shown in FIG. 13. Panels 152, 154, 156, and 158 extend downwardly from ceiling 150 toward bottom surface 138 of foot receiver 136. Bottom surface 138 is about flat and configured to lie in one of a number of planes and to cooperate with seat bench 24 to define tilt angle α.

Figure 16:
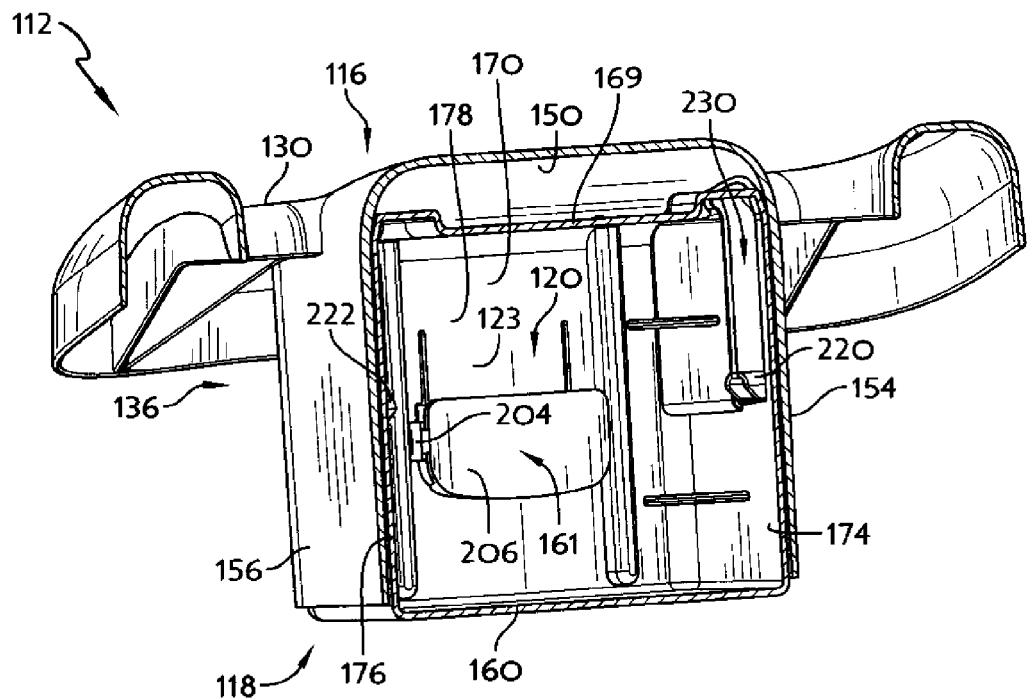
FIG. 16 is a rear perspective view of the adjustable base cut away to show the movable foot in the retracted-storage position and showing that the movable foot includes a first guide slot formed in a second side wall and a second guide slot formed in a third side wall and the carrier cradle includes first and second slide arms configured to extend through the first and second guide slots respectively so that the guide slots and slide arms cooperate to guide the movable foot as it is moved between the retracted-storage position and the extended position (as shown in FIG. 17) and showing that, in the retracted-storage position, the slide arms extend through the guide slots at a first position to block the movable foot from moving further into the foot-receiving cavity.

Ceiling 150 and panels 152, 154, 156, 158 cooperate to define foot-receiving cavity 132 as shown in FIG. 13. Foot-receiving cavity 132 is sized to receive movable foot 118 therein. Foot-receiving cavity 132 is sized to receive all of movable foot 118, except for a foot floor 160 of movable foot 118 that extends beyond bottom surface 138 and out of foot-receiving cavity 132 as shown in FIGS. 10 and 16.

Rear panel 152 is formed to include button-receiving aperture 162 and downwardly facing tab-engaging surface 140 which forms a portion of button-receiving aperture 162 as shown in FIG. 13. Button-receiving aperture 162 is sized to receive lock tab 120 coupled to movable foot 118 which extends through button-receiving aperture 162 when movable foot 118 is in the retracted-storage position. Downwardly facing tab-engaging surface 140 is engaged by lock tab 120 to block movable foot 118 from moving into foot-receiving cavity 132 and an upwardly-facing tab-engaging surface 141 is engaged by lock tab 120 to block movable foot 118 from moving out of foot-receiving cavity 132 as shown in FIG. 10.

Movable foot 118 includes a foot body 151 and tab panel 161 coupled to foot body 151 as shown in FIG. 13. Foot body 151 is configured to be received in foot-receiving cavity 132 and to position selectively carrier cradle 116 relative to seat bench 24. Tab panel 161 blocks lock tab 120 from overtravel when a caregiver presses lock tab 120.

Figure 14:
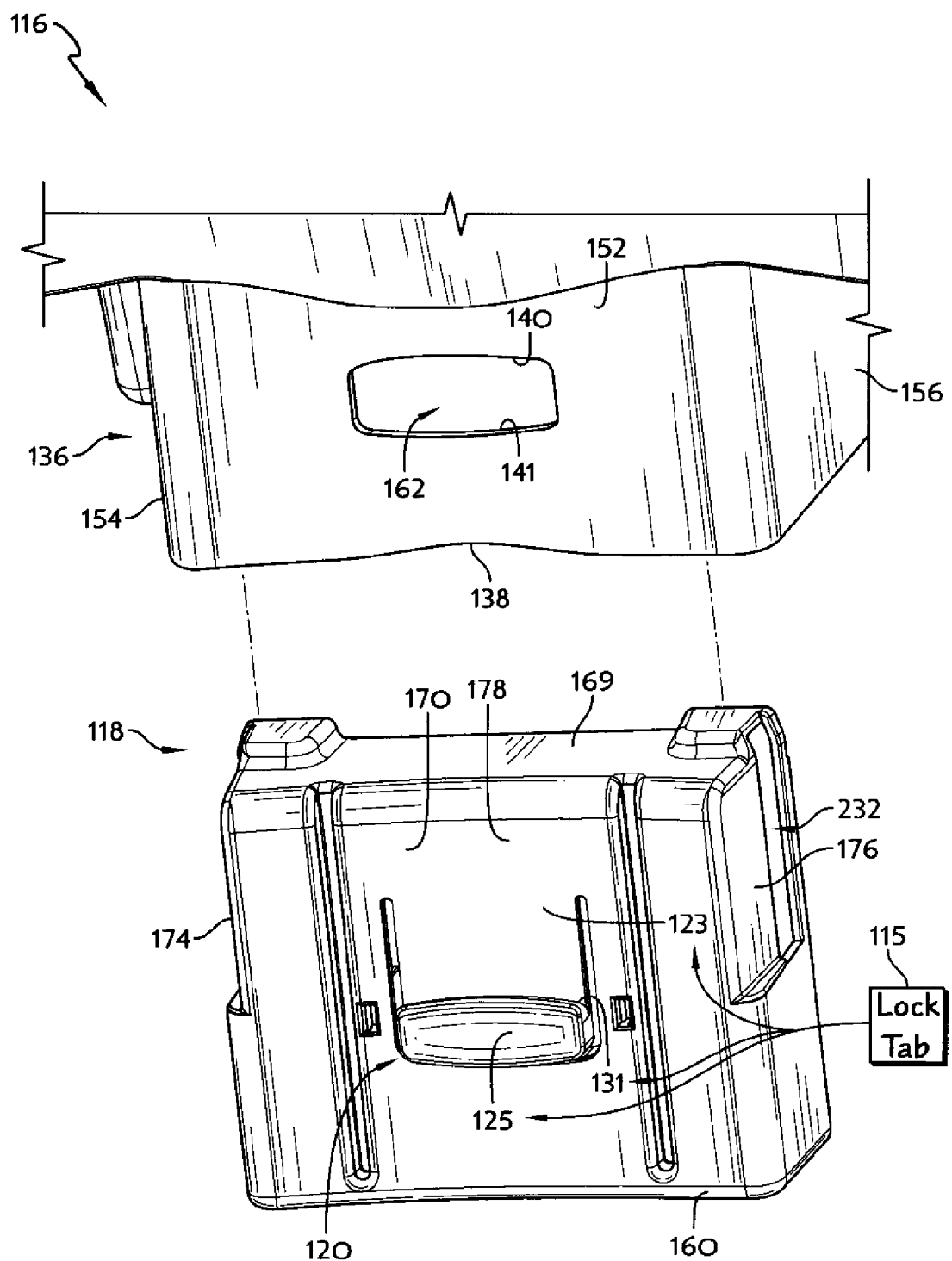
FIG. 14 is a front perspective view of a portion of the carrier cradle, along with the movable foot and the lock tab showing that the carrier cradle is formed to include an aperture arranged to mate with the lock tab to retain the movable foot in the retracted-storage position as show in FIG. 10 and showing that the carrier cradle is forward to include a bottom surface arranged to mate with the lock tab to retain the movable foot in the extended position as shown in FIGS. 11 and 12.

Foot body 151 includes a ceiling 169, foot floor 160, rear panel 170, left panel 174, and right panel 176 as shown in FIG. 13. Rear panel 170, left panel 174, and right panel 176 extend upwardly from foot floor 160 as shown in FIG. 13. Lock tab 120 is formed in rear panel 170 as shown, for example, in FIGS. 13-15. Foot body 151 and lock tab 120 cooperate to form a monolithic movable-foot unit 119 as shown in FIG. 14.

Lock tab 120 includes an elastic flange 123, a button 125, and a lip 131 as shown, for example, in FIG. 13. Elastic flange 123 is coupled to rear panel 170 of foot receiver 136 by living hinge 178. Button 125 extends outwardly from elastic flange 123 and engages foot receiver 136 to block movement of movable foot 118 into foot-receiving space 132. Lip 131 extends upwardly from button 125 to form a channel 131C between elastic flange 123 and lip 131. Channel 131C receives a portion of foot receiver 136 when button 125 engages foot receiver 136 and requires a caregiver to lift upwardly on the carrier cradle 116 to move the portion of the foot receiver 136 out of channel 131C before the caregiver can press button 125 and pivot lock tab 120 about living hinge 178 to disengage button 125 from foot receiver 136.

Figure 15:
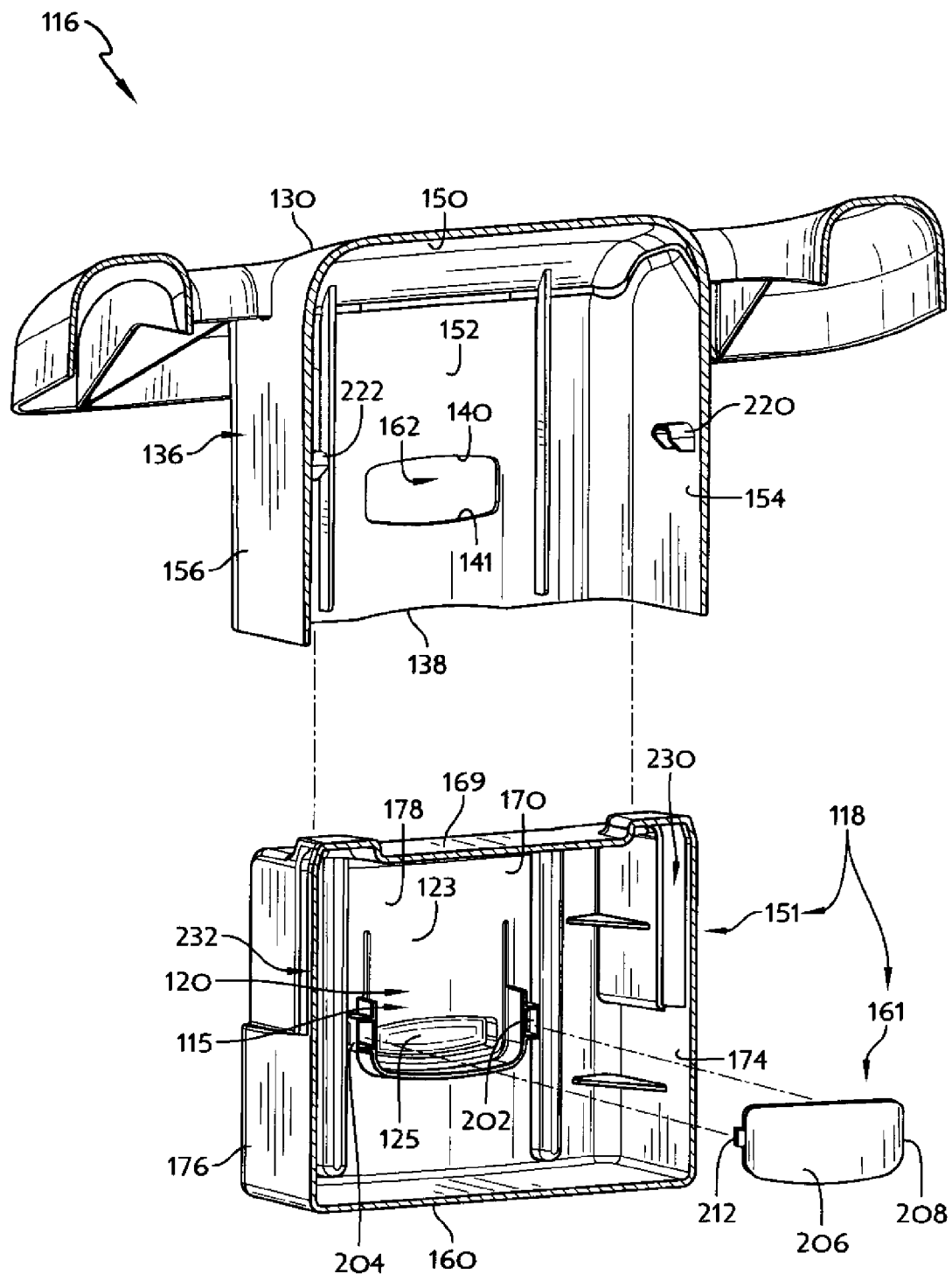
FIG. 15 is a rear perspective view of a portion of the carrier cradle, the lock tab, and a portion of the movable foot included in the adjustable base similar to FIG. 14 showing that the lock tab is formed by a U-shaped slot formed in the first side wall of the movable foot so that the lock tab is coupled to the movable foot at a living hinge and showing that the movable foot further includes the tab panel including a tab-cover plate, a first tab flange coupled to a first end of the tab-cover plate, and a second tab flange coupled to a second end of the tab-cover plate and suggesting that the first and second tab flanges engage corresponding first and second tab-flange receivers formed in the first side wall of the movable foot to couple the tab panel to the first side wall to block overtravel of the lock tab.

Tab panel 161 couples to rear panel 170 to block overtravel of lock tab 120 as shown in FIGS. 13 and 15. Rear panel 170 includes a left tab-flange receiver 202 located on a left side of lock tab 120 and a right tab-flange receiver 204 located on a right side of lock tab 120 as shown in FIG. 15. Left and right tab-flange receivers 202, 204 extend outwardly away from rear panel 152 and into foot-receiving cavity 132. Left and right tab-flange receivers 202, 204 mate with tab panel 161 to couple tab panel 161 to rear panel 170.

Tab panel 161 includes a tab-cover plate 206, a left tab flange 208 coupled to a first end of tab-cover plate 206, and a right tab flange 212 coupled to a second end of tab-cover plate 206 opposite the first end as shown in FIG. 13. Left tab flange 208 engages left tab-flange receiver 202 of rear panel 170 and right tab flange 212 engages right tab-flange receiver 204 to couple tab panel 161 to rear panel 152 as shown in FIG. 15. When a caregiver presses button 125 to cause elastic flange 123 pivot inwardly, button 125 contacts tab panel 161 and tab panel 161 blocks button 125 from traveling past tab-cover plate 206 which blocks elastic flange 123 from over travel.

Figure 17:
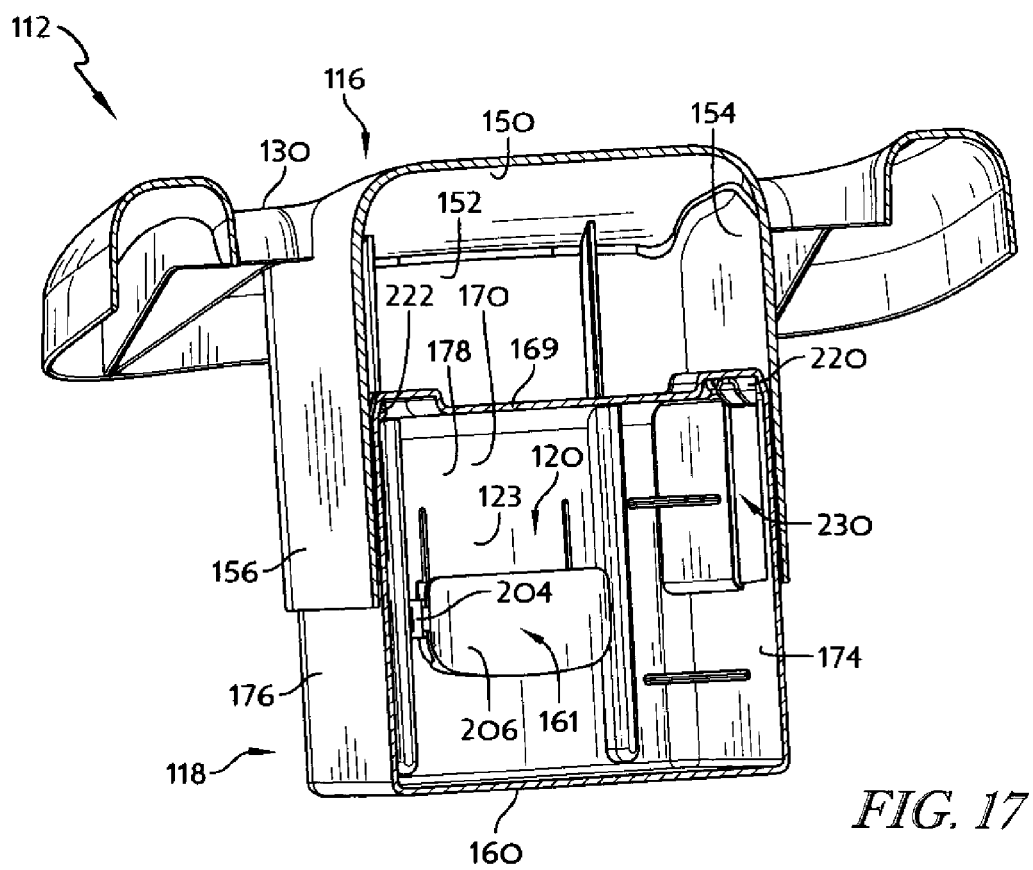
FIG. 17 is a view similar to FIG. 16 showing that when the movable foot is moved to the extended position, the slide arms guide the movable foot in the foot-receiving cavity and that the guide slots moves relative to the slide arms such that the slide arms extend through the guide slots at a second position to block the movable foot from moving further out of the foot-receiving cavity.

Adjustable base 112 includes a foot guide 250 for guiding movable foot 118 along a predetermined path as movable foot 118 is moved relative to carrier cradle 116 as shown, for example, in FIGS. 16 and 17. In the illustrative embodiment, foot guide 250 includes a pair of slide arms 220, 222 formed in foot receiver 136 and a pair of guide slots 230, 232 formed in movable foot 118 that are sized to receive slide arms 220, 222. Foot receiver 136 includes a left slide arm 220 coupled to left panel 154 and a right slide arm 222 coupled to right panel 156 as shown in FIG. 15. Movable foot 118 includes a left guide slot 230 formed in left panel 174 and a right guide slot 232 formed in right panel 176.

Guide slot 230, 232 are sized to receive slide arms 220, 222 so that left slide arm 220 extends through left guide slot 230 and right slide arm 222 extends through right guide slot 232 when movable foot 118 is received in foot-receiving cavity 132 as shown in FIGS. 16 and 17. Guide slots 230, 232 and slide arms 220, 222 cooperate to guide movable foot 118 as it is moved between the retracted-storage position and the extended position. In the retracted-storage position, slide arms 220, 222 extend through guide slots 230, 232 at a first position to block movable foot 118 from retracting further into foot-receiving cavity 132 as shown in FIG. 16. When a caregiver moves movable foot 118 to the extended position, slide arms 220, 222 guide movable foot 118 in foot-receiving cavity 132 and slide arms 220, 222 move relative to guide slots 230, 232 such that slide arms 220, 222 extend through guide slots 230, 232 at a second position to block movable foot 118 from extending further out of foot-receiving cavity 132 as shown in FIG. 17.

The invention claimed is:

1. A child restraint comprising
an infant carrier adapted to restrain an infant and
an adjustable base configured to support the infant carrier on a seat bench included in a passenger seat, the adjustable base including a carrier cradle formed to include an upwardly-facing carrier-receiving cavity sized to receive the infant carrier, and a downwardly-facing foot-receiving cavity at a foot end of the carrier cradle, a movable foot mounted to the carrier cradle for up-and-down linearly slideable movement into and out of the downwardly-facing foot-receiving cavity relative to the carrier cradle to elevate the foot end of the carrier cradle and change a tilt angle of the carrier cradle relative to the seat bench, and a foot-position latch coupled to the movable foot for movement therewith, wherein the foot position latch mates with the carrier cradle to block movement of the movable foot into the foot-receiving cavity to provide lock means for retaining the carrier cradle in the tilted position so that the infant carrier received in the carrier cradle is maintained in a selected position relative to the passenger seat, and
wherein the carrier cradle includes a carrier receiver that forms the upwardly-facing carrier-receiving cavity and a shell-support flange coupled to the carrier receiver along the foot end of the adjustable base to move with the carrier receiver, the shell-support flange is formed to include a downwardly-facing tab-engagement surface forming a bottom side of the carrier cradle, and the foot-position latch is arranged to engage the downwardly-facing tab-engagement surface of the shell-support flange to block the movable foot from moving into the foot-receiving cavity when the movable foot is moved out of the downwardly-facing foot-receiving cavity.

2. The child restraint of claim 1, wherein the shell-support flange is formed to include an aperture opening into the downwardly-facing foot-receiving cavity and the foot-position latch is arranged to engage the shell-support flange around the aperture to block the movable foot from moving into and out of the foot-receiving cavity when the movable foot arranged in a retracted-storage position mostly received in the downwardly-facing foot-receiving cavity.

3. The child restraint of claim 1, wherein the foot-position latch includes a first lock tab having a first elastic flange coupled to the movable foot at a first living hinge and a first button extending outwardly from the first elastic flange and the first elastic flange is arranged to pivot outwardly about the first living hinge to cause the first button to engage the downwardly-facing tab-engagement surface of the shell-support flange to block the movable foot from moving back into the foot-receiving cavity automatically when the movable foot is moved relative to the carrier cradle from a retracted storage position arranged mostly inside the downwardly-facing foot-receiving cavity to a partially-extended position extending partway out of the downwardly-facing foot-receiving cavity.

4. The child restraint of claim 3, wherein the movable foot is movable in the foot-receiving cavity relative to the carrier cradle between the retracted storage position, the first extended cradle-tilting position, and a fully-extended position arranged mostly-out of the downwardly-facing foot-receiving cavity.

5. The child restraint of claim 4, wherein the foot-position latch includes a second lock tab having a second elastic flange coupled to the movable foot at a second living hinge and a second button extending outwardly from the second elastic flange and the second elastic flange is arranged to pivot outwardly about the second living hinge to cause the second button to engage the downwardly-facing tab-engagement surface of the shell-support flange to block the movable foot from moving back into the foot-receiving cavity automatically when the movable foot is moved relative to the carrier cradle from the partially-extended position extending partway out of the downwardly-facing foot-receiving cavity to the fully-extended position arranged mostly-out of the downwardly-facing foot-receiving cavity.

6. The child restraint of claim 3, wherein the foot-position latch is disengaged from the downwardly-facing tab-engagement surface of the shell-support flange when the movable foot is in the retracted-storage position so that a caregiver is free to pull the movable foot out of the downwardly-facing foot-receiving cavity.

7. A child restraint comprising
an infant carrier adapted to restrain an infant and
an adjustable base configured to support the infant carrier on a seat bench included in a passenger seat, the adjustable base including a carrier cradle formed to include an upwardly-facing carrier-receiving cavity sized to receive the infant carrier and a downwardly-facing foot-receiving cavity at a foot end of the carrier cradle, a movable foot mounted to the carrier cradle for up-and-down movement into and out of the downwardly-facing foot-receiving cavity relative to the carrier cradle to elevate the foot end of the carrier cradle and change a tilt angle of the carrier cradle relative to the seat bench, and a foot-position latch coupled to the movable foot for movement therewith, wherein the foot position latch mates with the carrier cradle to block movement of the movable foot into the foot-receiving cavity to provide lock means for retaining the carrier cradle in the tilted position so that the infant carrier received in the carrier cradle is maintained in a selected position relative to the passenger seat,
wherein the carrier cradle includes a carrier receiver that forms the upwardly-facing carrier-receiving cavity and a shell-support flange coupled to the carrier receiver along the foot end of the adjustable base to move with the carrier receiver, the shell-support flange is formed to include a downwardly-facing tab-engagement surface forming a bottom side of the carrier cradle, and the foot-position latch is arranged to engage the downwardly-facing tab-engagement surface of the shell-support flange to block the movable foot from moving into the foot-receiving cavity when the movable foot is moved out of the downwardly-facing foot-receiving cavity, and wherein the foot-position latch includes a lock tab having a elastic flange coupled to the movable foot at a living hinge and a button extending outwardly from the elastic flange and the elastic flange is arranged to pivot outwardly about the living hinge to cause the button to engage the shell-support flange around an aperture to block the movable foot from moving into and out of the foot-receiving cavity when the movable foot is arranged in a retracted-storage position.

8. The child restraint of claim 7, wherein the button of the lock tab is arranged to engage the downwardly-facing tab-engagement surface of the shell-support flange to block the movable foot from moving back into the foot-receiving cavity automatically when the movable foot is moved relative to the carrier cradle from the retracted storage position arranged mostly inside the downwardly-facing foot-receiving cavity to a partially-extended position extending partway out of the downwardly-facing foot-receiving cavity.

9. The child restraint of claim 8, wherein the lock tab further includes a lip extending from the button, the lip forms a channel between the elastic flange and the lip, and the channel receives a portion of the carrier cradle when the button engages the carrier cradle whereby it is required to lift upwardly on the carrier cradle to move the carrier cradle out of the channel before a caregiver can press the button and pivot the lock tab about the living hinge to disengage the button from the carrier cradle and move the movable foot relative to the carrier cradle to change the tilt angle of the carrier cradle.

10. An adjustable base configured to support an infant carrier on a seat bench included in a passenger seat, the adjustable base comprising
a carrier cradle formed to include an upwardly-facing carrier-receiving cavity sized to receive an infant carrier and a downwardly-facing foot-receiving cavity at a foot end of the carrier cradle,
a movable foot mounted to the carrier cradle for up-and-down movement into and out of the downwardly-facing foot-receiving cavity relative to the carrier cradle to elevate the foot end of the carrier cradle and change a tilt angle of the carrier cradle relative to the seat bench,
a foot-position latch coupled to the movable foot for movement therewith and arranged to mate with the carrier cradle to block movement of the movable foot into the foot-receiving cavity to provide lock means for retaining the carrier cradle in the tilted position so that the infant carrier received in the carrier cradle is maintained in a selected position relative to the passenger seat, and
wherein the movable foot comprises a guide slot and the carrier cradle comprises a slide arm in the guide slot, the slide arm being positioned to block movement of the movable foot out of the receiving cavity.

11. The adjustable base of claim 10, wherein the carrier cradle includes a carrier receiver and a shell-support flange coupled to the carrier receiver along the foot end of the adjustable base, the shell-support flange is formed to include a downwardly-facing tab-engagement surface, and the foot-position latch is arranged to engage the downwardly-facing tab-engagement surface of the shell-support flange to block the movable foot from moving into the foot-receiving cavity when the movable foot is moved out of the downwardly-facing foot-receiving cavity.

12. The adjustable base of claim 11, wherein the shell-support flange is formed to include an aperture opening into the downwardly-facing foot-receiving cavity and the foot-position latch is arranged to engage the shell-support flange around the aperture to block the movable foot from moving into and out of the foot-receiving cavity when the movable foot arranged in a retracted-storage position mostly received in the downwardly-facing foot-receiving cavity.

13. The adjustable base of claim 11, wherein the foot-position latch includes a first lock tab having a first elastic flange coupled to the movable foot at a first living hinge and a first button extending outwardly from the first elastic flange and the first elastic flange is arranged to pivot outwardly about the first living hinge to cause the first button to engage the downwardly-facing tab-engagement surface of the shell-support flange to block the movable foot from moving back into the foot-receiving cavity automatically when the movable foot is moved relative to the carrier cradle from a retracted storage position arranged mostly inside the downwardly-facing foot-receiving cavity to a partially-extended position extending partway out of the downwardly-facing foot-receiving cavity.

14. The adjustable base of claim 13, wherein the movable foot is movable in the foot-receiving cavity relative to the carrier cradle between the retracted storage position, a first extended cradle-tilting position, and a fully-extended position arranged mostly-out of the downwardly-facing foot-receiving cavity.

15. The adjustable base of claim 14, wherein the foot-position latch includes a second lock tab having a second elastic flange coupled to the movable foot at a second living hinge and a second button extending outwardly from the second elastic flange and the second elastic flange is arranged to pivot outwardly about the second living hinge to cause the second button to engage the downwardly-facing tab-engagement surface of the shell-support flange to block the movable foot from moving back into the foot-receiving cavity automatically when the movable foot is moved relative to the carrier cradle from the partially-extended position extending partway out of the downwardly-facing foot-receiving cavity to the fully-extended position arranged mostly-out of the downwardly-facing foot-receiving cavity.

16. The child restraint of claim 13, wherein the foot-position latch is disengaged from the downwardly-facing tab-engagement surface of the shell-support flange when the movable foot is in the retracted-storage position so that a caregiver is free to pull the movable foot out of the downwardly-facing foot-receiving cavity.

17. An adjustable base configured to support an infant carrier on a seat bench included in a passenger seat, the adjustable base comprising
a carrier cradle formed to include an upwardly-facing carrier-receiving cavity sized to receive an infant carrier and a downwardly-facing foot-receiving cavity at a foot end of the carrier cradle,
a movable foot mounted to the carrier cradle for up-and-down movement into and out of the downwardly-facing foot-receiving cavity relative to the carrier cradle to elevate the foot end of the carrier cradle and change a tilt angle of the carrier cradle relative to the seat bench, and
a foot-position latch coupled to the movable foot for movement therewith and arranged to mate with the carrier cradle to block movement of the movable foot into the foot-receiving cavity to provide lock means for retaining the carrier cradle in the tilted position so that the infant carrier received in the carrier cradle is maintained in a selected position relative to the passenger seat,
wherein the carrier cradle includes a carrier receiver and a shell-support flange coupled to the carrier receiver along the foot end of the carrier cradle, the shell-support flange is formed to include a downwardly-facing tab-engagement surface, and the foot-position latch is arranged to engage the downwardly-facing tab-engagement surface of the shell-support flange to block the movable foot from moving into the foot-receiving cavity when the movable foot is moved out of the downwardly-facing foot-receiving cavity, and
wherein the foot-position latch includes a lock tab having a elastic flange coupled to the movable foot at a living hinge and a button extending outwardly from the elastic flange and the elastic flange is arranged to pivot outwardly about the living hinge to cause the button to engage the shell-support flange around an aperture to block the movable foot from moving into and out of the foot-receiving cavity when the movable foot is arranged in a retracted-storage position.

18. The adjustable base of claim 17, wherein the button of the lock tab is arranged to engage the downwardly-facing tab-engagement surface of the shell-support flange to block the movable foot from moving back into the foot-receiving cavity automatically when the movable foot is moved relative to the carrier cradle from the retracted storage position arranged mostly inside the downwardly-facing foot-receiving cavity to a partially-extended position extending partway out of the downwardly-facing foot-receiving cavity.

19. The adjustable base of claim 18, wherein the lock tab further includes a lip extending from the button, the lip forms a channel between the elastic flange and the lip, and the channel receives a portion of the carrier cradle when the button engages the carrier cradle whereby it is required to lift upwardly on the carrier cradle to move the carrier cradle out of the channel before a caregiver can press the button and pivot the lock tab about the living hinge to disengage the button from the carrier cradle and move the movable foot relative to the carrier cradle to change the tilt angle of the carrier cradle.

* * * * *